Figures 18, 19:
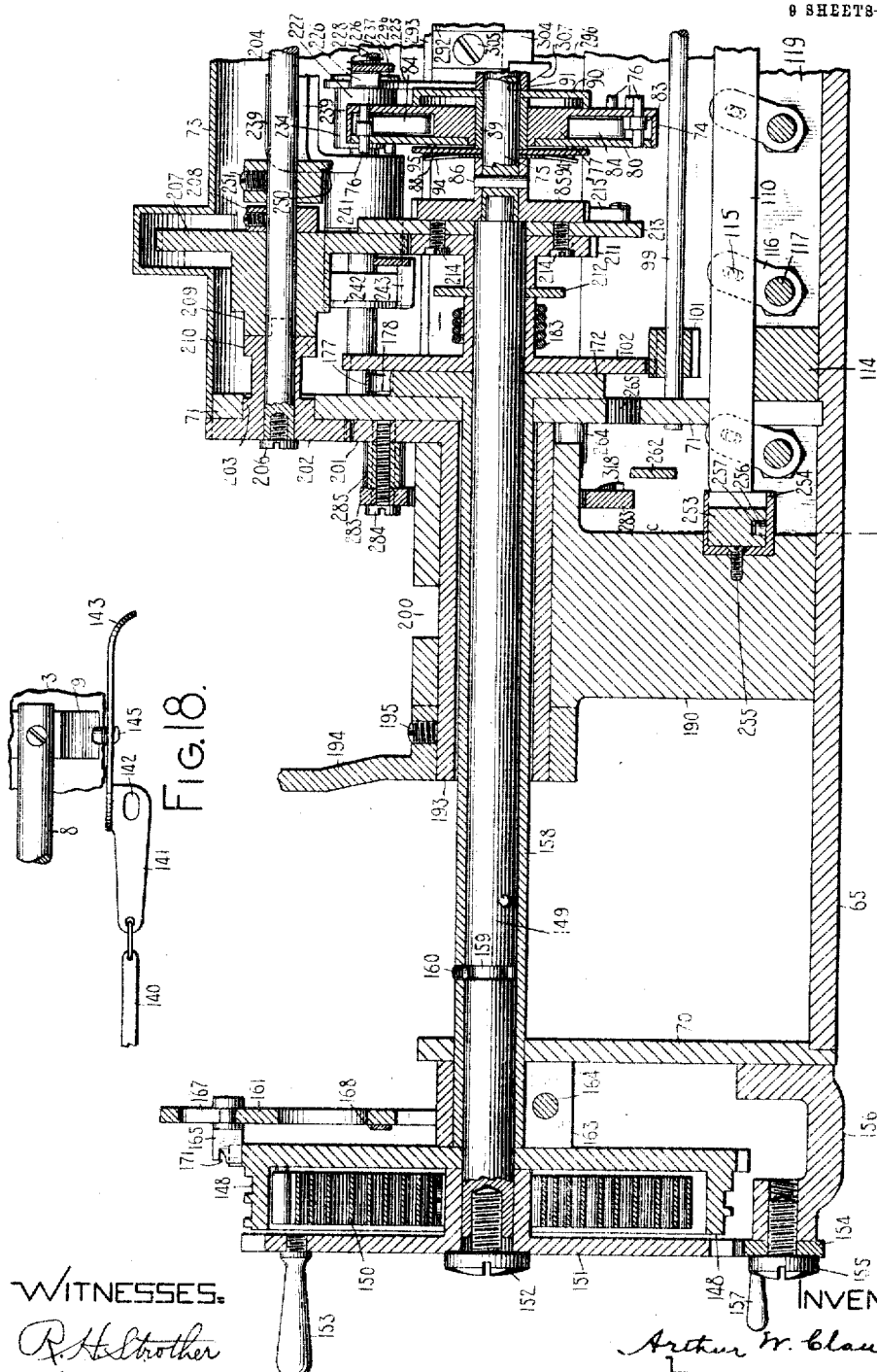

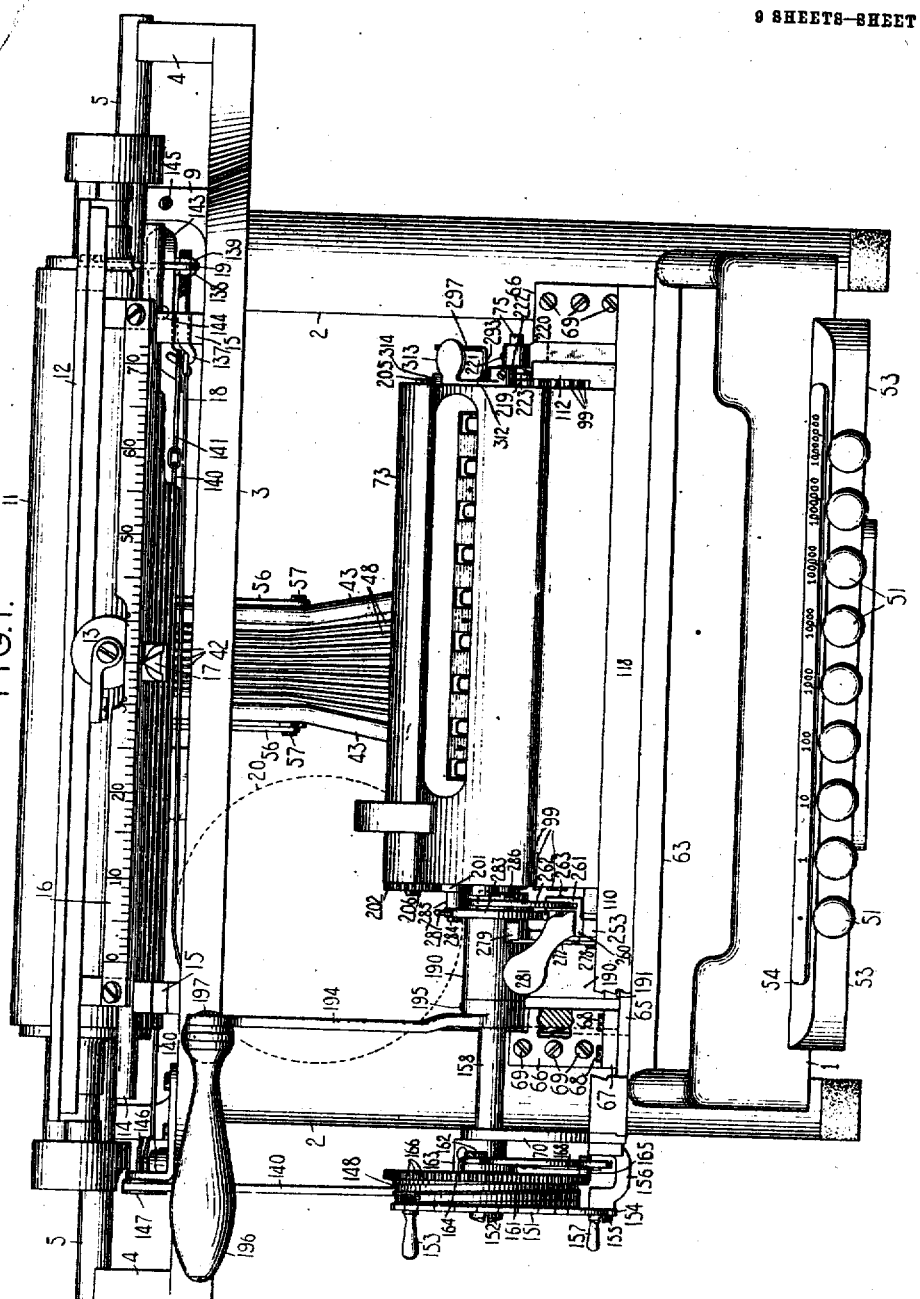

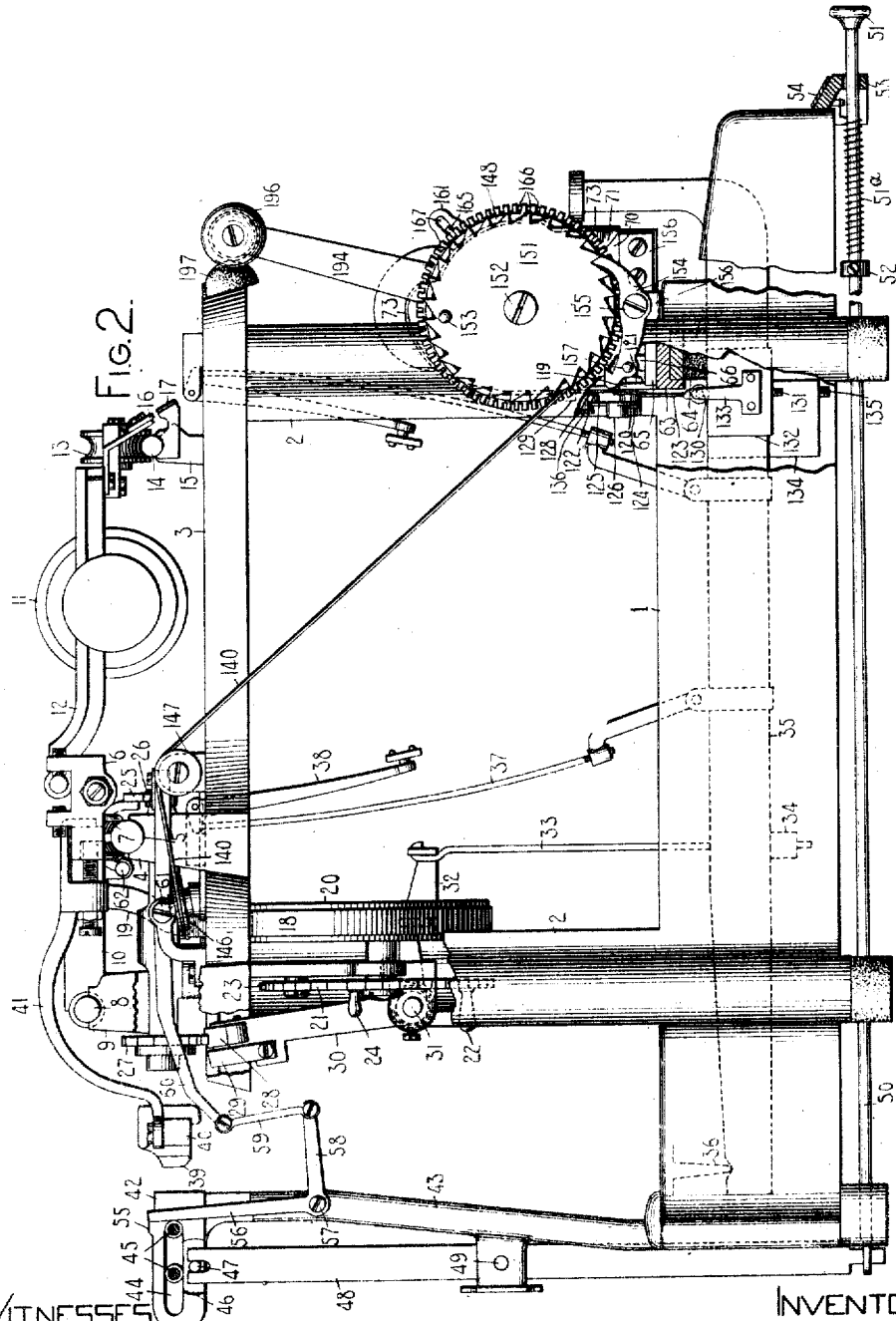

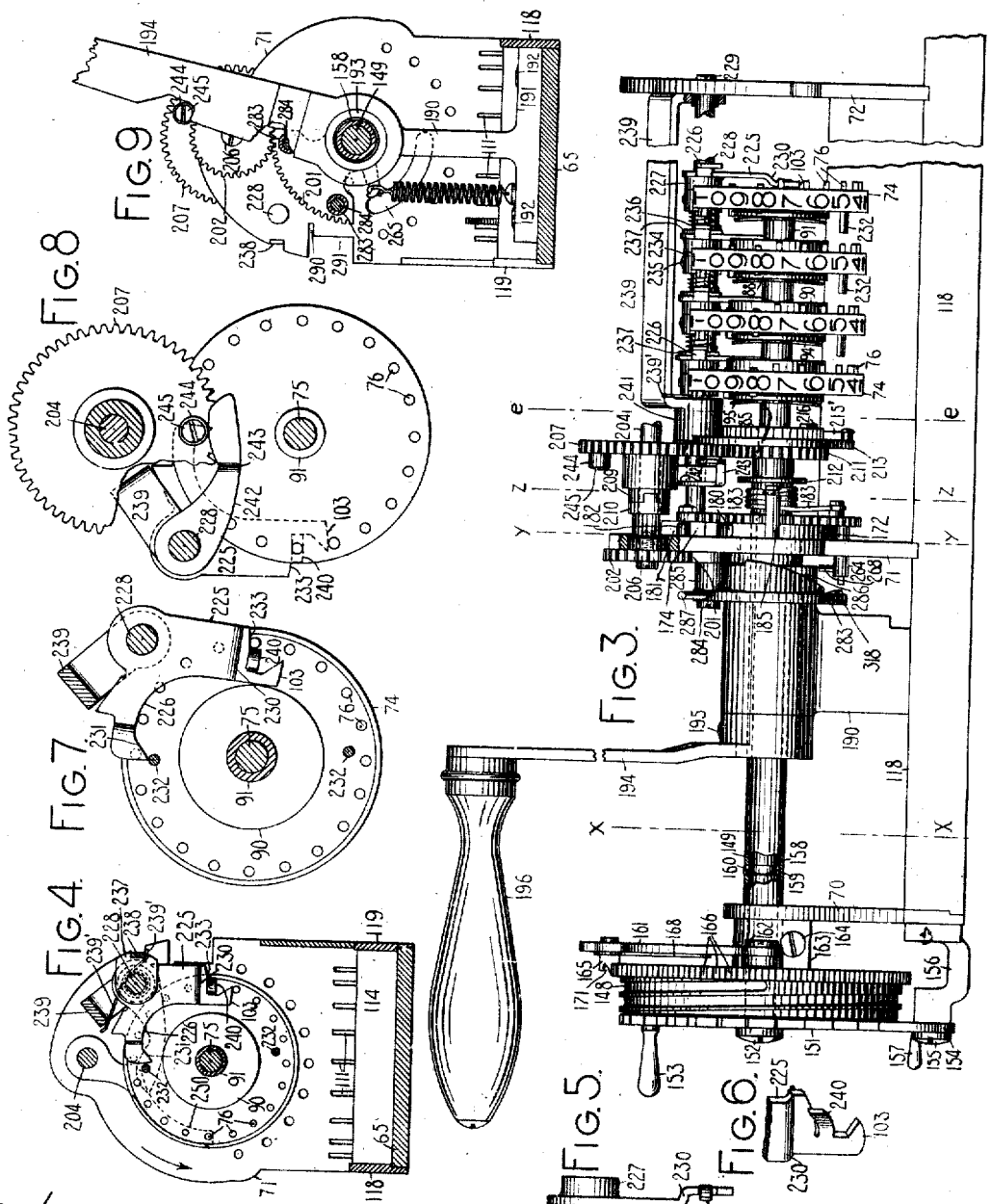

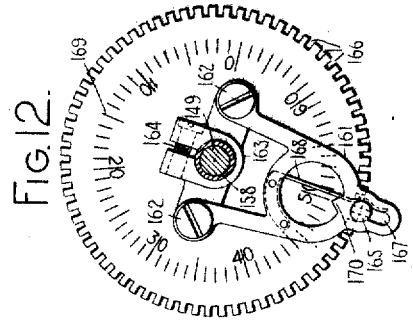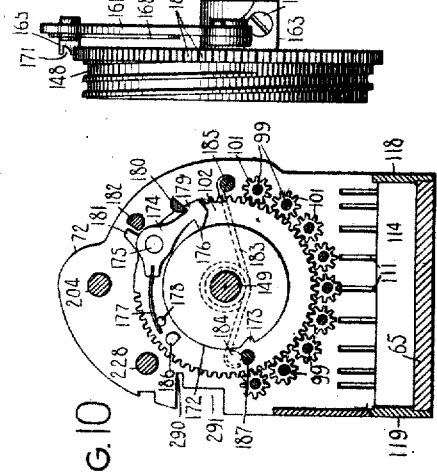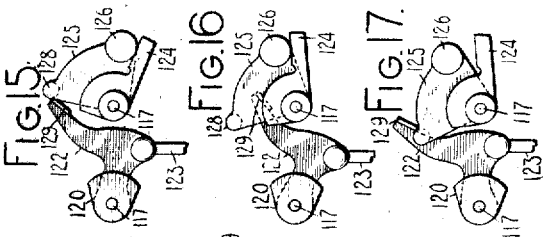

A. W. CLAUDER.
ADDING MACHINE.
APPLICATION FILED SEPT. 1, 1904.

996,976.

Patented July 4, 1911.

9 SHEETS—SHEET 5.

WITNESSES:
R. H. Strother
E. M. Wells

INVENTOR:
Arthur W. Clauder
by Jacob Felbel
HIS ATTORNEY

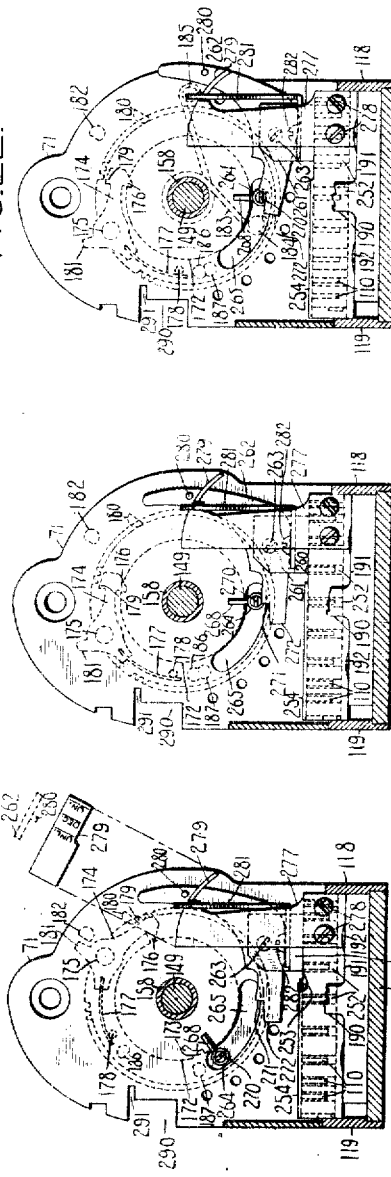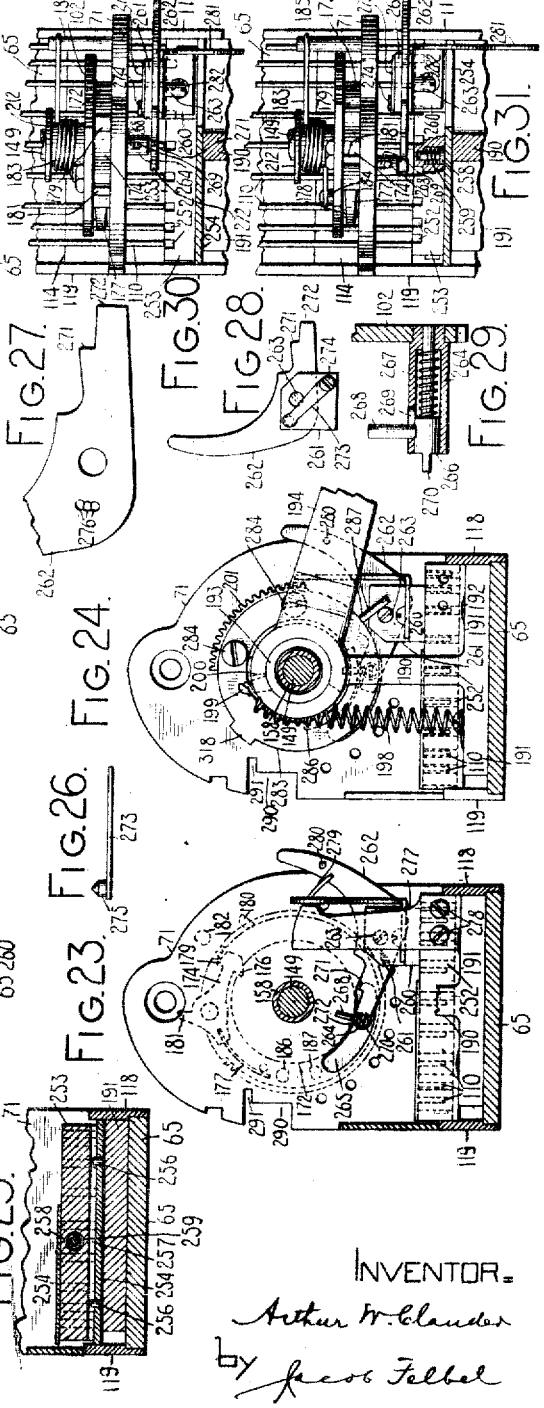

A. W. CLAUDER.
ADDING MACHINE.
APPLICATION FILED SEPT. 1, 1904.
996,976.
Patented July 4, 1911.
9 SHEETS—SHEET 7.
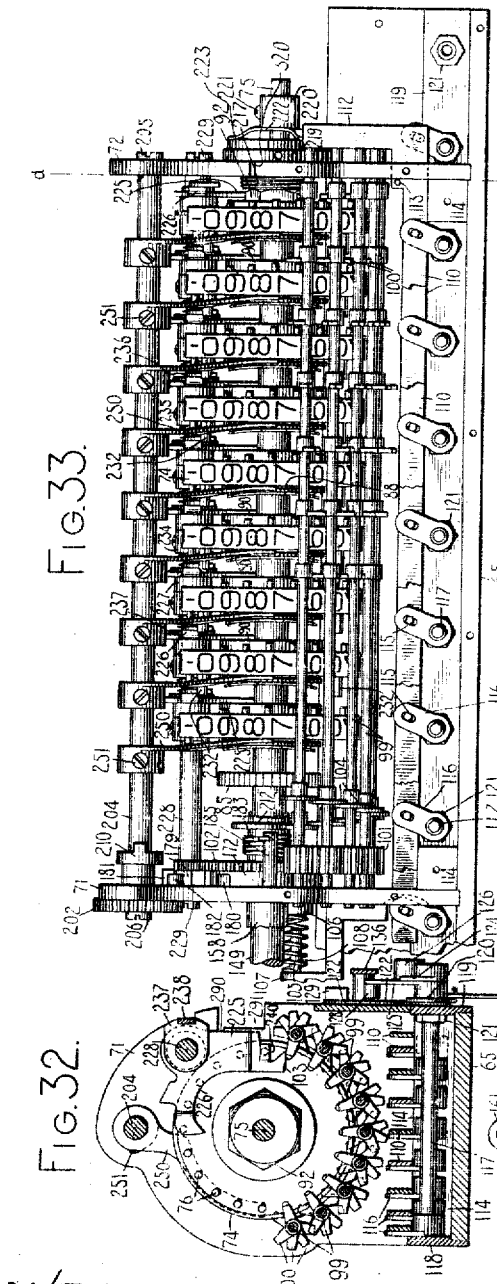
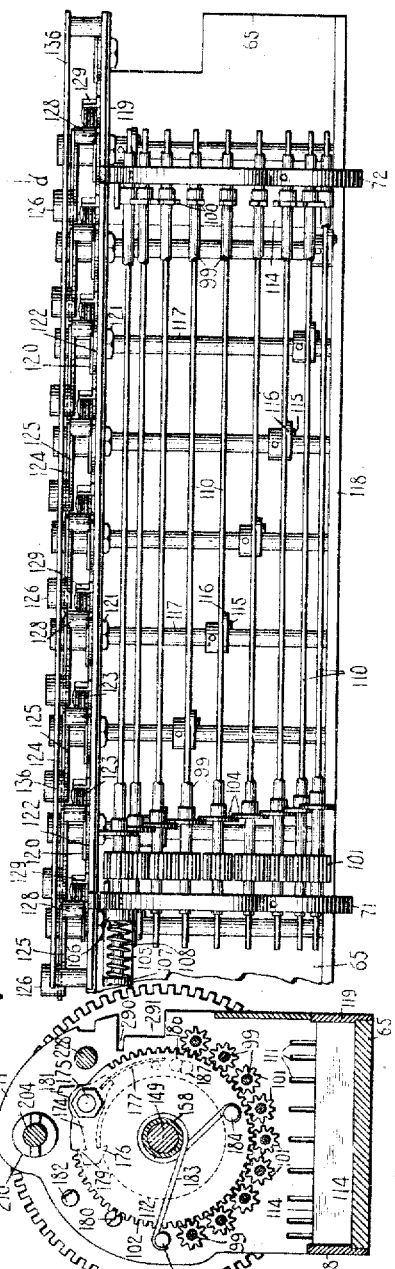
WITNESSES.
R. H. Strother.
E. M. Wells.
INVENTOR.
Arthur W. Clauder
by Jacob Felbel
His Attorney

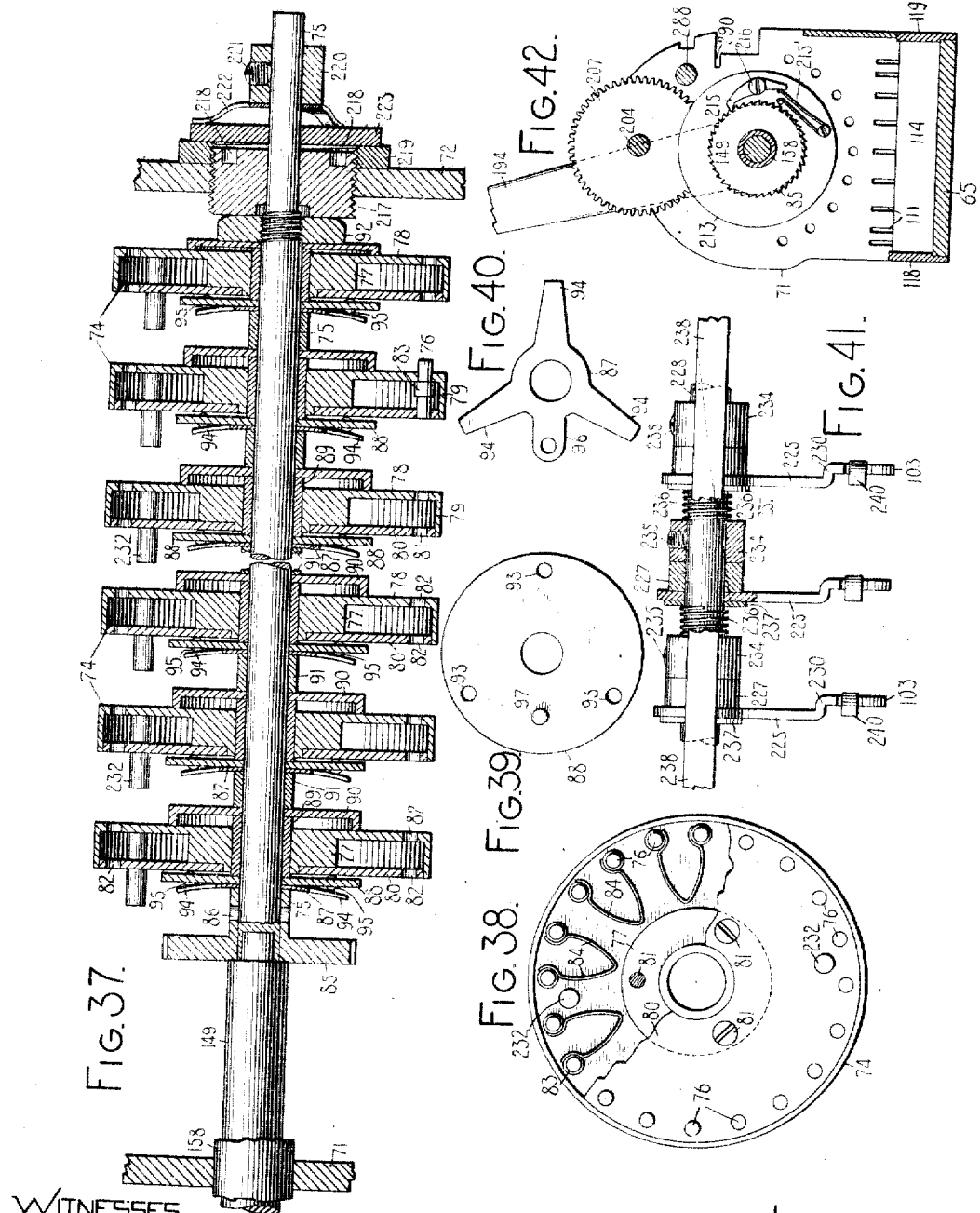

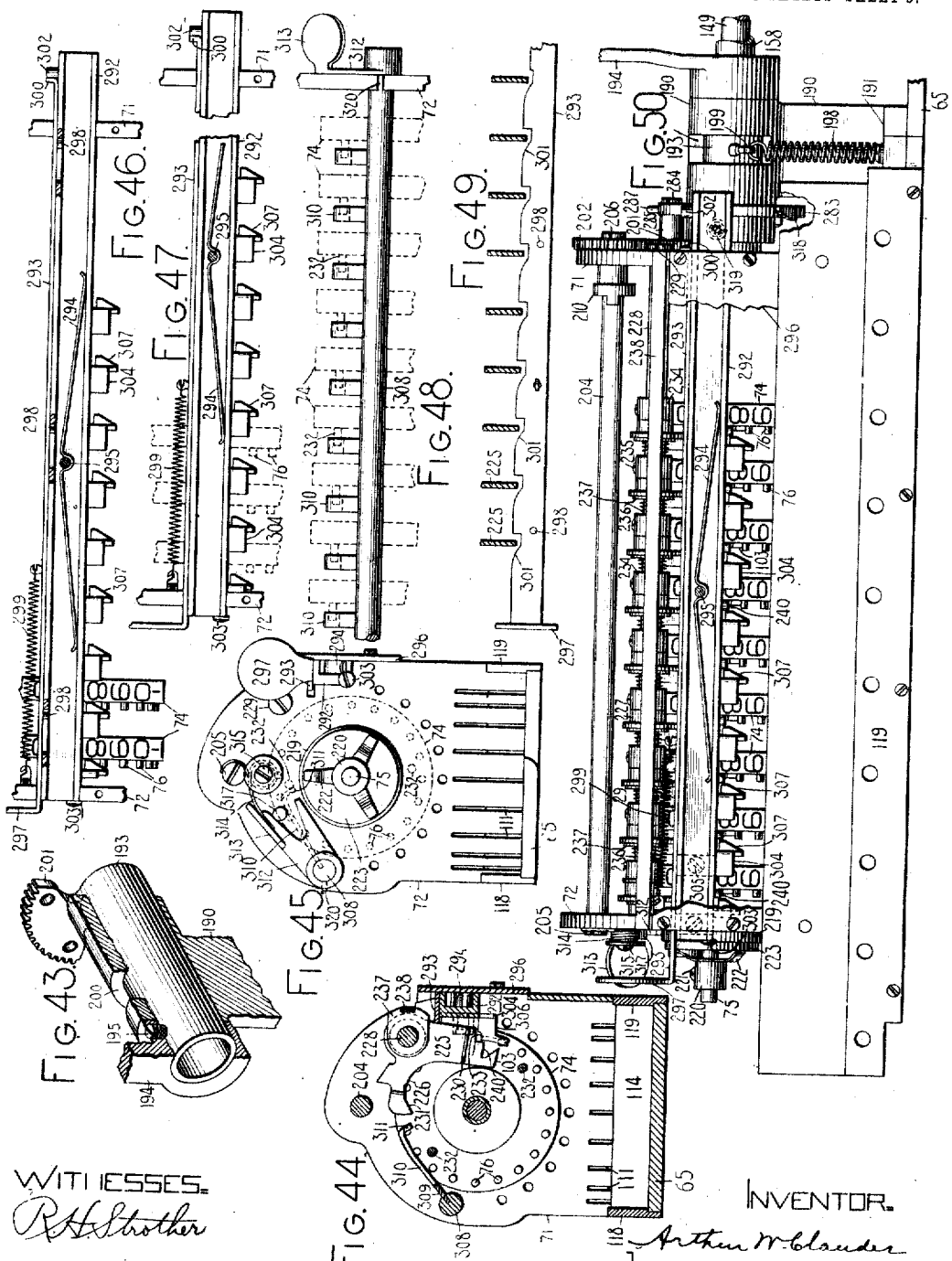

UNITED STATES PATENT OFFICE.

ARTHUR W. CLAUDER, OF BRIDGEPORT, CONNECTICUT, ASSIGNOR TO UNION TYPEWRITER COMPANY, OF JERSEY CITY, NEW JERSEY, A CORPORATION OF NEW JERSEY.

ADDING-MACHINE.

996,976.　　　Specification of Letters Patent.　　Patented July 4, 1911.

Application filed September 1, 1904. Serial No. 223,028.

*To all whom it may concern:*

Be it known that I, ARTHUR W. CLAUDER, citizen of the United States, and resident of Bridgeport, in the county of Fairfield and State of Connecticut, have invented certain new and useful Improvements in Adding-Machines, of which the following is a specification.

My invention relates principally to adding machines.

My invention relates also to combined typewriting and adding machines.

My invention has for its principal object to provide an improved device whereby numbers written on a typewriting machine may be automatically added. In carrying out these and other objects I have devised novel adding mechanism and novel means whereby such mechanism is connected to and controlled by the mechanism of a typewriting machine.

My invention consists in certain features of construction and combinations and arrangements of parts which will be hereinafter fully set forth and particularly pointed out in the claims.

In order that my invention may be understood, I have illustrated and shall describe in detail one embodiment thereof, but it will of course be understood that many of the parts are capable of wide modification without departing from my invention and many of the features of my invention are capable of use in other and widely different relations.

In the accompanying drawings, Figure 1 is a front elevation of a typewriting machine having my improvements applied thereto; Fig. 2 is a side elevation of the same; Fig. 3 is a front elevation of the adding attachment with the casing removed and parts broken away; Fig. 4 is a transverse vertical section of the adding mechanism, the section being taken between two of the register wheels; Figs. 5, 6, 7 and 8 are detail views illustrating portions of the transfer mechanism; Fig. 9 is a section on the line x—x of Fig. 3 looking toward the right, parts being shown broken and parts sectioned away; Fig. 10 is a section on the line y—y of Fig. 3 looking toward the right; Fig. 11 is a detail showing in front elevation certain parts which are controlled by the carriage of the typewriting machine; Fig. 12 is a view in vertical section on the line a—a of Fig. 11 looking toward the left; Fig. 13 is an enlarged view in section on the line b—b of Fig. 14 looking toward the right; Fig. 14 is a view in rear elevation of the devices whereby the adding mechanism is connected with the keys of the typewriting machine, said keys being shown in section; Figs. 15, 16 and 17 are detail views of one of said actuating devices, the parts being shown at different points in the operation of a key in the different views; Fig. 18 is a detail plan view of a portion of the means whereby the adding mechanism is controlled by the carriage of the typewriting machine; Fig. 19 is an enlarged vertical sectional view of the left-hand end of the adding mechanism; Figs. 20, 21, 22 and 23 are views in elevation on an irregular section, parts being broken away. The parts are shown in different positions in the different views; Fig. 24 is a view approximately in vertical section on the line x—x of Fig. 3 and looking toward the right. In this figure the operating lever is shown in its depressed position; Fig. 25 is a detail view in vertical section on the line c—c of Fig. 19 looking toward the right; Figs. 26, 27, 28 and 29 are detail views of a certain locking mechanism; Figs. 30 and 31 are fragmentary plan views showing a portion of the mechanism shown in Fig. 20; Fig. 32 is a vertical sectional view on the line d—d of Fig. 33; Fig. 33 is a front elevation of a portion of the adding mechanism; Fig. 34 is a detail view; Fig. 35 is a view in elevation on the line z—z of Fig. 3 looking toward the left; Fig. 36 is a top view of a portion of the adding mechanism with the register wheels removed; Fig. 37 is a longitudinal central section through the register wheels; Fig. 38 is a face view of one of the register wheels with a part thereof broken away; Figs. 39 and 40 are detail views of part of the registering mechanism; Fig. 41 is a view in rear elevation and partly in section of part of the transferring mechanism; Fig. 42 is a view of a portion of the operating mechanism taken on a section represented by the line e—e of Fig. 3 and looking toward the left; Fig. 43 is a detail perspective view of a portion of the operating mechanism; Fig. 44 is a view similar to Fig. 4 but showing the zero setting devices in position; Fig. 45 is an end view of the adding mechanism as seen from the right; Figs. 46, 47, 48 and 49 are detail views illustrating the zero setting devices; and Fig. 50 is a rear elevation showing the zero setting devices in position.

In most of the views parts have been shown in section and parts have been removed or broken away as has been found most convenient for the purpose of illustration.

Most typewriting machines comprise a stationary portion and a carriage, and key and type mechanism are usually mounted in one of these portions and the paper in the other. In most book typewriters the paper is stationary and the key mechanism and type mechanism are mounted in the carriage and move across the paper, while in most other sorts of typewriters the key and type mechanisms are mounted in the stationary part of the machine and the paper platen is mounted on the carriage and is fed across the stationary part of the machine. My adding device may be readily adapted to either of these sorts of typewriting machines. I have here shown it applied to a Remington No. 6 typewriting machine which belongs to the latter of the two classes named above. This machine is well known in the art and I have shown in Figs. 1 and 2 only so much thereof as is necessary to illustrate the manner in which my adding mechanism is connected to and controlled by it.

The main frame of this machine comprises a base portion 1, from which rise posts 2, which support a top plate 3. Posts or brackets 4 rising from said top plate support a stationary rail 5 on which a carriage truck 6 is supported by means of rollers 7 (Fig. 2). A guide rod 8 parallel to the rod 5 is supported on posts 9 and an arm 10 projecting toward the back of the machine from the carriage truck engages the rod 8 and prevents the carriage from rocking about the rod 5. The platen 11 is mounted in a platen frame 12 which at its rear side is pivotally connected to the carriage truck and at its front side is supported by a roller or wheel 13 which runs on a rod 14 which is mounted on arms 15, which are pivoted to the framework, so that the platen may be moved back and forth for case shifting in a manner well known in the art. A carriage scale 16 is mounted on the front of the platen frame and coöperates with an index 17 which is rigidly mounted on the rod 14. The carriage is drawn across the machine by a band 18 which is connected at one end with a bracket 19 which depends from the carriage truck and at its other end to a spring drum 20 on the periphery of which it is wound. The spring in the drum 20 is connected at its inner end with a shaft, on the rear end of which is mounted a ratchet wheel 21 having a crank handle 22 projecting from its face and controlled by an escapement pawl 23 having a handle 24. The spring may be tightened by turning the ratchet wheel by means of the handle 22 and it may be loosened by manipulating the pawl 23 by means of its handle 24. This mechanism is old and well known. The traverse of the carriage is controlled by an escapement mechanism which is geared to a rack bar 25 which meshes with a pinion 26 which is fixed on one end of a shaft, which is journaled in a stationary part of the framework and on the rear end of which is mounted an escapement wheel 27. Escapement dogs 28 and 29 coöperate with the escapement wheel 27. Said pawls are mounted on an arm 30 of a dog rocker which is pivoted at 31 and has forwardly extending arms 32 which are connected by links 33 with a universal bar 34 which lies beneath all the key levers 35. Said key levers are pivoted at 36 and are connected by links 37 with the type bars 38 in a manner well known in the art.

Where it is desirable to add together numbers written on a typewriting machine, such numbers are frequently written in columns and the operation of thus writing numbers in columns is greatly facilitated by the use of a denominational tabulator. I have accordingly shown the typewriting machine to which my adding mechanism is attached equipped with the well known Gorin tabulator. This mechanism comprises one or more tabulator stops 39 (Fig. 2) which are adjustably mounted on a bar 40 which is rigidly mounted on arms or brackets 41, which in turn are rigidly mounted on the carriage truck. A series of denominational stops 42 are adapted to coöperate with the tabulator stop 39 and said denominational stops are mounted in a framework 43 which is secured to the back of the base portion 1 of the main frame of the typewriting machine.

The denominational stops 42 consist of strips of metal, each of which is formed with an elongated slot 44 through which pass stationary frame rods 45, by which the stops 42 are supported. Each of said stops has a cut-away portion 46, and a pin 47 projecting from said stop into said cut-away portion is embraced by the forked end of a lever 48 which is pivoted to the frame 43 on a rod 49, the lower end of which is reduced and passes through the slotted end of a push rod 50 which extends to the front of the machine and has a tabulator key 51 fixed on the forward end thereof. The rod 50 is normally drawn toward the front of the machine by a spring 51ª which is coiled about said rod and one end of which is connected to a collar 52 secured on said rod and the other end of which is connected to a stationary portion of the framework. The construction is such that if the key 51 be pushed toward the back of the machine the lever 48 will be rocked and will push the denominational stop 42 toward the front of the machine into the path of the tabulator stop 49. There is a series of denominational stops and their working faces are a letter space distance apart. There is also a series of levers 48, all of said levers being pivoted on the rod 49, and a corresponding series of rods 50 are connected with said levers. Said rods are supported at their forward ends by passing through suitable openings in a bracket 53 which is secured to the front plate of the base portion of the main frame. A scale plate 54 is mounted on the bracket 53 and said scale plate has characters thereon to designate the respective denominational values of the different tabulator keys. Each of the denominational stops 42 has a lug 55 projecting from its upper edge and these lugs are in position to operate a universal bar which is in the form of a yoke bar which connects two arms 56, which are pivoted to the frame 43 at 57. One of the arms 56 has integral therewith a forwardly extending arm 58 which is connected by a link 59 with a lever 60 which is pivoted at 61 to a bracket which rises from the top plate 3. The lever 60 has a forwardly extending arm which lies beneath the rack bar 25. This rack bar is mounted on arms which are pivoted to the truck at 62. The construction is such that if any tabulator key be operated the arms 56 will be moved toward the front of the machine, the arm 58 will be depressed and will depress the rear end of the lever 60 and the front end of said lever will lift the rack bar 25 out of engagement with the pinion 26 and thus release the carriage from its escapement mechanism. The carriage will then be drawn across the machine by the spring drum 20 until the tabulator stop 39 encounters the operated denominational stop when said carriage will be arrested in the denominational position corresponding to the tabulator key which has been operated. When the tabulator key is released the parts will return to normal position and the rack bar 25 will drop into engagement with the pinion 26.

As shown in Figs. 1 and 2, the framework of the typewriting machine comprises a bar 63 which extends across the front of the machine between the two posts 2 and which has fixed to the under side thereof a pad 64 of sound deadening material against which the key levers strike when they return to normal position. Most of my adding attachment is mounted between these front posts just above the bar 63. As shown, for example, in Fig. 19, the framework of the adding mechanism comprises a base plate 65 which extends from end to end of said mechanism. As shown in Fig. 1, a clamp 66 is secured to each of the front posts 2, and each of said clamps has a forwardly extending portion 67 which is secured by screws 68 to the base plate 65 of the adding mechanism. The clamp pieces 66 have a U-shaped horizontal cross-section and the two arms of this U-shaped piece embrace the flange of the post 2, to which they are clamped by tightening set screws 69 which are threaded through the clamp piece and the inner ends of which engage the post. Set screws may also be threaded through the clamp pieces back of the posts 2, so that the adding mechanism may be adjusted in a front to rear direction on the typewriting machine by properly adjusting the set screws and may be clamped in position by tightening said set screws. As shown, for example, in Figs. 3 and 19, a frame plate or bracket 70 is secured to the end of the base plate 3 and two other frame plates 71 and 72 also rise from said base plate and have the register wheels located between them. Most of the adding mechanism is supported on these three frame plates. As shown in Figs. 1 and 19, a casing 73 extends from the frame plate 71 to the frame plate 72 and covers most of the adding mechanism.

As best shown in Figs. 19, 37 and 38, the register wheels 74 are mounted side by side on a shaft 75 which extends longitudinally of the machine, and each of said register wheels has mounted therein a series of stop pins 76, one stop pin for each digit. As will be understood by reference to Figs. 3, for example, each of the register wheels has on its periphery two series of digits from 0 to 9, and I have accordingly mounted twenty stop pins in each register wheel. As shown in Fig. 37, each of the register wheels comprises a hub portion 77 from one end of which extends a web portion 78, and the cylindrical drum portion 79 of the wheel is integral with the hub portion and web portion. The hub is formed with an annular shoulder, as shown, to which a circular plate 80 is secured by screws 81 (Fig. 38), thus leaving an annular hollow in the wheel. The stop pins 76 are mounted in openings 82 (Fig. 37), which extend through the plate 80 and the web 78 of the wheel. Each of the pins 76 is formed within the hollow portion of the wheel with an annular enlargement 83 (Fig. 37) which limits the sliding motion of the pin. The parts are so proportioned that when the pin is in either of its extreme positions one end thereof extends beyond the surface of the wheel and the other end thereof is substantially flush with the surface of the wheel. The pins are frictionally held in either of their positions by flat springs 84 (Figs. 19 and 38), the ends of each of which engage two of said pins, the springs being compressed between the pins. In Fig. 19 the pins 76 in the upper part of the register wheel 74 are shown projecting from the left-hand face of the wheel and those in the lower portion are shown projecting from the right-hand face of the wheel. The rotation of the register wheels is controlled by moving these pins into and out of the path of a stop. In the present instance this stop is mounted on the right-hand side of each wheel so that those pins which are in their right hand position are in operative position and those which are in their left-hand position are in inoperative position. These stop pins may be broadly referred to as digit determining members.

The register wheels may be turned by a variety of means, but I prefer to provide an independent frictional connection between the several wheels and the shaft 75, which is therefore the driving shaft for said wheels. As shown in the present instance, for example, in Fig. 37, a ratchet wheel 85 is rigidly mounted on the left-hand end of the driving shaft 75 by a pin 86 which passes through the hub of the ratchet wheel and through the shaft. Adjacent the end of said hub there is mounted on the shaft 75 a spring plate 87 (Figs. 37 and 40); next to this a disk 88 (Figs. 37 and 39), then a sleeve 89, then a flanged disk 90, next a sleeve or collar 91, then another spring plate 87, disk 88, sleeve 89, etc., along the shaft; there being one spring plate 87, disk 88, sleeve 89 and flanged disk 90 for each register wheel, and these sets of devices being spaced apart by the collars 91. The register wheels are journaled on the sleeves or collars 89. Just to the right of the right-hand register wheel, the shaft 75 is formed with a screw thread on which is threaded a nut 92 which is tightened so as to compress the whole series of devices which have just been described between said nut and the hub of the ratchet wheel 85. The construction is such that all of these devices are rigidly secured to the shaft and turn therewith. As shown in Fig. 39, each of the disks 88 has a plurality of holes 93 near its periphery, three such holes being shown in the present case. Each of the spring plates 87 has three arms 94 which respectively stand opposite the holes 93 in the disk 88. An anti-friction ball 95 is loosely mounted in each of the holes 93, and these balls are pressed into engagement with the surface of the register wheel by the resilience of the arms 94 of the spring plate 87. The pressure of these spring arms is thus transmitted to the wheel which is thereby pressed into frictional contact with the flange of the disk 90. The construction is such that if the shaft 75 be rotated, the frictional contact of the register wheel with the balls 95 and the flanged disk 90 tend to turn said wheel with the shaft; but if one of the stop pins 76 is in engagement with a stop, or if the wheel is positively held against rotation by any other means, the shaft may turn freely without turning the wheel. In order to insure that the arms 94 shall register correctly with the holes 93, the spring plate 87 is formed with an arm 96 having an opening therein which fits over a pin 97, which projects from the adjacent disk 88.

The setting devices for setting the pins 76 to add numbers are best shown in Figs. 10, 14 and 32-36. A series of light shafts 99 are mounted near their ends in the frame plates 71 and 72, so as to be free to turn and also free to slide lengthwise through a limited distance. There are nine of these shafts, one for each digit to be added, and they are arranged parallel with the shaft 75 in such a manner that each of the shafts 99 stands in a radial line through one of nine consecutive pins 76, as shown in Fig. 32. As will be understood by reference to Figs. 14-34, for example, each of the shafts 99 has rigidly mounted thereon a series of arms 100 which are arranged spirally. In the present case I have shown nine register wheels and each of the shafts 99 is provided with seven arms 100, one for each of the first seven register wheels. The two wheels of highest denomination are actuated only by transfer. In Fig. 34 one shaft 99 is shown in normal position, while in Figs. 32 and 33 the arms 100 on the several shafts are shown in position to set pins in the register wheel of lowest denomination. By reference to these figures it will be seen that each of the shafts 99 has its right hand arm 100 in such position that if said shaft be moved longitudinally to the left, one of the pins 76 of the right-hand register wheel would be pushed to inoperative position. It will also be seen by reference to these figures that if all of the shafts be turned in unison a suitable distance, the arms 100 may be set to coöperate with any desired register wheel of the series. It will also be perceived that if the shafts 99 be always turned in unison and turned through suitable distances, the pins of only one wheel will be covered by the arms 100, and that all of the arms 100 corresponding to that particular wheel will be in operative position. In order that these shafts may be turned in unison, each of them has a pinion 101 mounted thereon near its left-hand end, and all of said pinions mesh with a gear wheel 102 which is mounted coaxially with the driving shaft 75. The rotation of the wheel 102, and consequently of the shafts 99, is controlled by the carriage of the typewriting machine by means which will be hereinafter described.

As shown in Fig. 32 one of the pins 76 is in engagement with a stop 103, and this pin and the eight succeeding pins are covered by arms 100 of the several shafts 99. It will be perceived that if the first pin be pressed to inoperative position, the register wheel will be free to turn through one unit of rotation; if the first two pins be pressed to inoperative position the wheel will be free to turn through two units, and so on. In order to add any digit on this wheel therefore, a number of pins must be pressed in inoperative position corresponding to the digit to be added. I have accordingly provided means whereby if the first shaft 99, counting from the stop 103, be moved toward the left to press its pin to inoperative position, no other shaft will be affected by this movement; but if any other shaft be operated, the longitudinal motion of that shaft will be communicated to all of the other shafts between that one and the stop 103. To this end each of the shafts 99 has mounted thereon a circular disk 104 (Figs. 33 and 36) and each of these disks slightly overlaps the disk of the adjacent shaft, the disks being arranged in regular succession as shown in Fig. 36, the shaft nearest the back of the machine and therefore nearest the stop 103 having its disk farthest to the left. It will be perceived that if the ninth shaft 99 be pressed to the left, all of the other shafts will be moved to the left with it. This being the construction, only one spring is necessary to return the shafts 99 to their normal right-hand positions, and this spring coöperates with the first of said shafts. This spring is shown at 105, and it is compressed between a collar 106 fixed on the shaft 99 outside of the frame plate 71, and a bracket 107, which is secured to the frame plate 71. The collar 106 limits the motion of the shaft 99 under the impulse of the spring 105. The motion of this shaft in the other direction is adjustably limited by a pin 108 about which the spring 105 is coiled and the end of which is in position to be engaged by the end of the shaft 99. The pin 108 has an enlarged portion which is threaded through the bracket 107, so that the pin may be adjusted in said bracket. This pin is locked in adjusted position by a lock nut 109. In order to permit of the longitudinal motion of the shafts 99, the pinions 101 mounted thereon are elongated as shown in Figs. 33 and 36, so that said pinions will not become disengaged from the gear wheel 102 when said shafts are moved longitudinally.

The first shaft 99 is operatively connected with that typewriter key which is used to print the numeral one; the second shaft is connected with that typewriter key which prints the numeral two, and so on. As shown in Figs. 33 and 36 there is mounted directly beneath each of the shafts 99 a slide 110. These slides pass loosely through slots 111 (Fig. 35) in the frame plates 71 and 72. Outside of the frame plate 72 each of the slides has an upwardly extending arm 112 (Fig. 33) which engages the right-hand end of the corresponding shaft 99. The construction is such that if any of the slides 110 be moved longitudinally to the left, the corresponding shaft 99 will also be moved longitudinally to the left. The motion of each of these slides toward the right is limited by a pin 113 (Fig. 33) which projects from the slide in position to engage the frame plate 72. The slides rest on cross pieces 114 which are secured to the base plate 65 (Fig. 33). In said Fig. 33 the several slides 110 are shown broken away. By reference to this figure and Fig. 36 it will be seen that each of the slides 110 has projecting from one side thereof a pin 115 which works loosely in a slot in an arm 116 which is rigidly mounted on a rock-shaft 117. There are nine of these rock shafts, one for each digit, and they extend from front to back of the machine just above the base plate 65, being journaled at their forward ends in a flange or strip 118 which extends longitudinally of the machine and is rigidly secured to the base plate 65 and the frame pieces 114. The shafts 117 are supported at their rear ends by another strip 119 similar to the strip 118.

The connections between the several shafts 117 and their respective key levers will be best understood by reference to Figs. 13 and 14. As shown in Fig. 13, the shafts 117 are not journaled directly in the strip 119 but each of said shafts is reduced at its rear end and such reduced portion of the shaft is journaled in a bushing 120 which has the form of a headed and shouldered bolt which is inserted through an opening in the strip 119 and is rigidly secured in place by a nut 121, which is threaded to the bushing. A lever 122 is pivoted on the shouldered portion of the bushing 120 between the head of said bushing and the strip 119, being held in position by the head of the bushing. This lever consists of a flat piece of metal, and it has pivoted thereto a link 123, the lower end of which is pivoted to one of the numeral key levers. Each of the rock shafts 117 extends beyond the bushing 120 and has fixed on its end the hub of an arm 124. Between the hub of said arm 124 and the head of the bushing there is pivoted on the shaft 117 a lever 125. This lever is in the form of a segment but is in effect a bell crank lever. It has an enlarged lug 126 projecting from it toward the back of the machine and normally lying over the arm 124, as shown in Fig. 14. The upper part of the lever 125 has a shouldered and headed screw 127 (Fig. 13) threaded into it and extending toward the front of the machine, and on this screw is journaled an anti-friction roller 128. Each of the levers 122 has a flange or cam 129 projecting from its end toward the back of the machine. The construction is such that if a key lever be depressed, the lever 122 will be rocked about the bushing 120 as a pivot and the cam 129 on this lever will engage the anti-friction roller 128 of the lever 125 which is pivoted to the next rock shaft 117 to the left. By reference to Fig. 14, it will be seen that the extreme left-hand rock shaft 117 has no lever 122 mounted thereon, as this shaft is operated by that lever 122 which is associated with the next shaft 117 to the right. Also, an additional lever 122 is pivoted to the right of the extreme right-hand rock shaft 117. This additional lever 122 has been used in Figs. 15, 16 and 17 to illustrate the operation of this mechanism. As shown in Fig. 14, the cams 129 are not normally in engagement with the rollers 128. In Fig. 15 the lever 122 is shown in the position it occupies when the key lever is partially depressed. In this figure the cam 129 has moved the lever 125, and the lug 126 has depressed the arm 124 and rocked the shaft 117. In Fig. 16 the parts are shown in the position they occupy when the key lever is depressed a slightly greater distance. In this figure the cam 129 has escaped past the roller 128 and the shaft 117, arm 124 and lever 125 have returned to normal position, being no longer under the influence of the key.

In Fig. 17 the parts are shown in the position they occupy when the key lever is partially restored to normal position. In this figure the cam 129 has engaged the roller 128 from beneath and has lifted the lever 125 out of engagement with the arm 124. When the key lever is fully restored to normal position the roller 128 escapes from the cam 129 and the lever 125 drops back to normal position, being actuated by the weight of the lug 126 which is made large and heavy for this purpose. It will thus be seen that the shaft 117 is under the control of the key lever through only a small part of the down-stroke of such key lever. When the cam 129 engages the roller 128 it rocks the shaft 117 far enough to set the pins in the register wheel, and the cam, after moving a short distance, escapes from the roller, after which the shaft 117 and the parts connected therewith immediately return to normal position under the impulse of the spring 105, so that the adding mechanism is ready for the next key stroke before the operated key is released. It will also be perceived that this entire setting mechanism is controlled by this single returning spring. By this arrangement a minimum resistance is thrown on the typewriter keys by the adding mechanism. The rocking of the shaft 117 far enough to press the spring 105 through a small fraction of an inch is the only work thrown on the typewriter keys by the adding mechanism. This is very slight and does not interfere with the successful operation of the typewriter as such.

It will be perceived that a rock shaft 117 is connected with a key during a portion only of the down stroke of the key, so that all of the work done by the key on the adding mechanism is performed before the key reaches the end of its down stroke. As shown in the present case, the parts are so designed that the cam 129 does not engage the roller 128 until the key has moved through a certain distance; in other words there is a certain amount of lost motion between said cam and said roller. It is obvious, however, that the parts may be so designed that the engagement between the cam and roller may take place either earlier or later in the stroke of the key by arranging the cam a less or greater distance from the roller when the parts are in their normal position.

The manner in which the links 123 are connected with the key levers is shown in Figs. 2 and 14. Each of said links has a pin 130 projecting therefrom through an eye in the upper end of a small rod or bar 131 which extends through an opening made through the key lever edgewise. The key lever is clasped by a U-shaped piece of metal 132 and the pin or bar 131 is threaded through this piece of metal. A flat spring 133 is secured to the side of the metal plate 132, and it presses at its free end against the end of the link 123, thus holding the pin 130 in its eye. The link may be quickly disengaged from the key lever by pulling the pin 130 out of its eye against the tension of the spring 133. The numeral keys of the typewriting machine are frequently arranged irregularly and such an arrangement is shown in the present case, in which it will be seen that the "1" key stands between the 8 and the 9 keys. In order to remedy this irregularity I have secured to the "1" key a bracket 134 which extends downward from said key lever and to one side beneath the 9 key lever. A post 135 is threaded into the bracket 134 and the link 123 is pivoted to this post in the same manner as that in which the other links are pivoted to the rods 131. If necessary, the links 123 may be off-set in the manner shown in Fig. 14 in case the numeral key levers are not directly under the appropriate levers 127.

In order to prevent the levers 125 from being thrown too far when they are raised to the position shown in Fig. 17, by the return of a key lever to normal position, a strip 136 is secured to the framework. This strip lies behind the levers 127 and 125 and in position to be struck by the lugs 126 and thus prevent any overthrow of the levers 125.

The register wheel which at any particular moment is under the control of the keys is selected by the rotation of the shafts 99, which rotation is controlled by the gear wheel 102. This gear wheel is controlled by the typewriter carriage by means which will now be described. As shown in Fig. 1, the band 18 which draws the carriage across the machine is connected with the bracket 19 by a hook 137, the stem of which is threaded and passes through an opening in the bracket 19. Two nuts 138 and 139 on opposite sides of said bracket hold the hook in position and afford an adjustment of said hook relative to the carriage. The denomination selecting mechanism is controlled by a second band, chain or cord 140, the end of which is connected with a plate 141, which has an opening 142 therein (Fig. 18), which is adapted to receive the hook 137. The plate 141 has bent up therefrom a handle portion 143 in which is an opening 144. In case it is desired to disconnect the adding mechanism from the carriage the plate 141 may be disconnected from the hook 137 and be connected by said opening 144 with a hook or pin 145 which projects from one of the frame posts 9 of the typewriter carriage (Figs. 1 and 18). When the plate 141 is connected with the hook 137 the denomination selecting mechanism may be nicely adjusted with relation to the carriage by means of the nuts 138 and 139. The cord 140 is led over two pulleys 146 and 147 mounted on the top plate 3 of the typewriting machine and is wound about a spring drum 148, in the periphery of which is formed a spiral groove, as shown in the drawing, to permit of more than one rotation of the drum without causing one coil of the cord to lie on top of another and thus in effect change the radius of the drum. As shown in Fig. 19, the spring drum 148 is journaled on a shaft or rod 149 and a coiled spring 150 within the drum has its outer end connected with said drum and its inner end connected with the hub of a ratchet wheel 151 which is also journaled on the shaft 149 on which it is held against endwise motion by a headed screw 152, which is threaded into the end of said shaft. The ratchet wheel 151 is provided with a handle 153 by which it may be turned to tighten the spring and said wheel is engaged by a retaining pawl or dog 154 which is pivoted on a headed screw 155, which is threaded into a bracket 156 which is secured to the frame piece 70. As shown in Fig. 2 the pawl 154 is in effect a pallet and the spring 150 may be allowed to partially unwind by oscillating this pawl or pallet, a handle 157 being provided for the purpose. It will be perceived that the spring drum 148 assists the spring drum 20 in drawing the carriage across the machine and also that the tension of both of the springs is adjustable. It will, of course, be understood that the spring drum 148 may be used alone, and the drum 20 be dispensed with if desired. When the plate 141 is hooked to the carriage so that the tension of the spring 150 is communicated to said carriage, the spring in the drum 20 may be relaxed and the combined tension of the two springs may be regulated at pleasure. The shaft or rod 149 lies loosely within a sleeve 158 which is journaled in the frame plates 70 and 71 as best shown in Fig. 19. The shaft 149 does not touch any stationary portion of the machine but is supported by the sleeve 158. Said shaft is formed with a peripheral groove 159 into which projects the end of a screw 160 which is threaded through the sleeve 158. This connection permits of relative rotation of the shaft and sleeve but holds the shaft against endwise motion. The inner end of the shaft 149 is reduced, as shown for example in Fig. 19, and the reduced end of the shaft constitutes the bearing of the left-hand end of the driving shaft 75. The wheel 102 and some portions of the driving mechanism are journaled on the shaft 149 and, as has been stated above, the spring drum 148 and the ratchet wheel 151 are also journaled on this shaft. The arrangement is one which affords great economy of space and permits a number of rotary parts to be mounted along the same axis of rotation. The motion of the spring drum 148 under the control of the carriage is communicated to the sleeve 158 by an arm 161 (Figs. 11 and 12) which is secured by screws 162 to a split hub 163 which is clamped on the sleeve 158 by a screw 164, which passes through one portion and is threaded into the other portion of said split hub. The arm 161 is adjustably connected with the spring drum 148 by a catch 165, one end of which is adapted to be inserted in any one of a series of notches 166 formed in a flange projecting from the periphery of the spring drum. The catch 165 passes through a radial slot 167 in the arm 161, so that it may be moved into or out of engagement with the spring drum. The catch is held in either of its positions by a spring 168 which is secured to the arm 161 and which is curved to yieldingly retain the catch in either of its positions.

The notches 166 are spaced apart a distance equal to the distance through which the spring drum turns on each letter space movement of the carriage. The face of the web of the drum is graduated, as shown at 169 in Fig. 12, and a pointer or index 170 formed on the arm 161 coöperates with the graduations. The parts are so proportioned that when the pointer 170 registers with any particular graduation on the spring drum the selecting mechanism will be in such position as to correctly add numbers written on the typewriting machine in a column in which the decimal point stands at the letter space position corresponding to that graduation. If, as shown in Fig. 12, the index registers with the graduation numbered 50, the machine will add numbers which are written in a column in which the decimal point stands at the letter space position indicated by the numeral 50 on the carriage scale 16. When this adjustment is made on the adding mechanism the tabulator stop 39 will also be set to arrest the carriage at the graduation numbered 50 when the tabulator key corresponding to the decimal point is operated. As shown in Fig. 11, the catch 165 has a notch 171 formed therein to assist in drawing the catch out of engagement with the notched periphery of the drum.

As shown in Fig. 19, the sleeve 158 has a wheel or disk 172 rigidly mounted thereon or formed integral therewith just inside the frame plate 71. Endwise motion of the sleeve is prevented by this wheel and by the hub 163. The gear wheel 102 has an elongated hub, as shown in Fig. 19, and is journaled on the shaft 149 close to the disk 172. This disk has a circular periphery which is smooth except that it has formed therein a notch 173 (Fig. 10) having one of its faces abrupt and the other inclined. A dog 174 is pivoted on a stud 175 projecting from the left-hand face of the wheel 102, and the hook end 176 of said dog is pressed against the periphery of the disk 172 by a spring 177 which is secured at one end to the dog and which presses at its free end against a pin 178 which projects from the face of the wheel 102. The wheel 102 and dog 174 are shown in Fig. 10 in their normal position, in which position the shafts 99 stand in the position shown in Fig. 34 with none of the arms 100 in position to operate any pin 76. In this position of the parts the dog 174 is positively locked in position. A hook 179, formed on the side of said dog away from the disk 172, is caught behind a pin 180 which projects from the frame plate 71, thus preventing rotation of the wheel 102 toward the back of the machine. Rotation of said wheel in the other direction is prevented by an arm 181 which projects radially from the dog 174 and into the path of which a pin 182 projects from the frame plate 71. By an inspection of Fig. 2 it will be seen that when the carriage is fed across the typewriting machine from right to left the spring drum 148 turns toward the back of the machine and the disk 172, turning in unison with said drum, will also turn toward the back of the machine or to the left, as shown in Fig. 10. The disk 172 turns without affecting the dog 174 and gear wheel 102 until the notch 173 reaches the point 176 of said dog, when the dog will drop into the notch under the impulse of the spring 177, thus freeing the hook 179 from the pin 180 and leaving the wheel 102 free to turn with the disk 172. The wheel 102 is turned in this direction by a spring 183 which is coiled about its hub and which at one end is connected to a pin 184 projecting from the face of said wheel and at the other end to a pin 185 projecting from the frame plate 71. The wheel 102 cannot turn faster than the disk 172 because of the engagement of the abrupt face of the point 176 with the abrupt face of the notch 173. The dog 174 is shown in dotted lines in its normal inoperative position in Fig. 20 and in its operative position in Fig. 21. After the dog 174 drops into the notch 173 the next step of the carriage through a letter space distance, turns the wheel 102 and each of the shafts 99 through a unit's distance, which brings the arm 100 of each of said shafts into position to operate a pin in the seventh register wheel. The next step of the carriage turns the shafts through another unit of rotation, bringing into operative position those arms 100 which coöperate with the sixth register wheel, and the fifth, fourth and third register wheels are thus successively brought under the control of the keys. As will be seen by an inspection of Fig. 34, the sixth angular space on the shaft 99 is vacant, no arm 100 being provided in this angular space. The sixth step of the carriage, therefore, disconnects the adding mechanism from the register wheels and in the corresponding letter space position on the paper a decimal point may therefore be written. The next step of the carriage brings the second register wheel and the next succeeding step, the first register wheel under the control of the keys, this last being the position of the parts shown in Figs. 32 and 36. It will thus be seen that the machine shown in the present case is geared up to add amounts in United States money, a space being left for the decimal point between the dollars and dimes columns. It is obvious that a greater or less number of arms 100 might be employed and that these arms might be spaced in different ways for different styles of punctuation. As shown, for example, in Fig. 10, the wheel 102 has a pin 186 projecting from the left-hand face thereof and a pin 187 projects from the frame plate 71 into the path of the pin 186.

When the parts reach the position shown in Figs. 32 and 21 with the register wheel of lowest denomination under the control of the keys, the next step of the carriage brings the pin 186 into contact with the pin 187, and the wheel 102 is thus positively held against further rotation in this direction. At the next succeeding step of the carriage, therefore, the disk 172 moves on in the same direction as before and the dog 174 is cammed out of the notch 173 by the coöperating oblique faces of said notch and of the point 176 of said dog. If the carriage is fed farther across the machine, the dog 174 rides idly on the smooth periphery of the disk 172, leaving the wheel 102 and the shafts 99 stationary with none of the arms 100 in operative position. When the carriage is returned to the right-hand side of the machine to begin a new line, the disk 172 is turned toward the front of the machine until the notch 173 reaches the point 176 of the dog 174, when said point drops into said notch and said dog and the wheel 102 are carried with the disk until the tail 181 of the dog engages the pin 182, when said dog is arrested, and the point thereof is lifted out of the notch by said pin and the hook 179 engages behind the pin 180, after which the point of the dog rides idly on the smooth periphery of the disk. When the wheel 102 is turned in this manner the shafts 99 are restored to their normal position shown in Fig. 34. Since the disk 172 is controlled by the arm 161, it will be perceived that when the latch 165 on said arm is disconnected from the spring drum 148 and the arm 161 is turned independently of said drum, the disk 172 is also turned and the point in the travel of the carriage at which the dog 174 will be caught up by the disk 172 will be varied. It will be perceived that the adding column may thus be moved to any desired point in the line of writing by adjusting the arm 161 relatively to the spring drum 148.

It will be perceived that the denomination selecting mechanism does not impose any work on the carriage, but that said mechanism is operated by its own spring 150 which assists in feeding the carriage across the machine. It will also be perceived that when the point 176 of the dog drops into the notch 173, the work of turning the shafts 99 does not fall either on the carriage or on the spring 150, but is performed by the spring 183, which is merely controlled in its action by the carriage. During the time that this spring is in operation it is of some slight assistance in feeding the carriage. So far as I am aware it is broadly new to thus throw into operation a special motor which actuates a denomination selecting mechanism under the control of the escapement mechanism of the carriage.

The driving shaft 75 is actuated and a number of other operations in the mechanism are effected by an operating mechanism which will now be described. So far as the parts which have thus far been described are concerned, this operating mechanism may have any one of a variety of forms; for example, the shaft 75 might be continuously rotated as long as the machine is in operation, in which case each register wheel would begin to turn immediately upon the setting of one or more of its stop pins, so that as soon as a digit had been written it would be immediately added on the adding mechanism; or the shaft 75 may stand still while the several digits of a number are being set up on the register wheels by operating the stop pins and after all of the digits of the number have been set up, the shaft may be turned and all of the register wheels on which the digits have been set up may be operated at once. The present machine is designed for the latter mode of operation. As shown for example in Fig. 9, a post or bracket 190 has a broad base 191 which is secured to the base plate 65 by screws 192, said bracket being located between the frame plates 70 and 71. As best shown in Figs. 19 and 43 the upper end of said bracket is formed into an elongated bearing for a hollow shaft 193, through which the sleeve 158 passes longitudinally. There is no contact between the sleeve 158 and the hollow shaft 193, but the construction is such that these parts are adapted to rotate about a common axis.

On the left-hand end of the hollow shaft 193 an operating lever 194 is mounted and is rigidly secured by a set screw 195, which is threaded through the hub of said operating lever and engages the hollow shaft. The lever 194 has an operating crank handle 196 mounted on its free end and said lever stands normally in the nearly upright position shown in Figs. 1 and 2, in which position it is arrested by a buffer 197 of sound deadening material, said buffer being secured to the top plate of the typewriting machine. The lever 194 is operated by being drawn down by hand to its operated position, shown in Fig. 24, and it is returned to normal position by a spring 198 which is secured at one end to the base portion 191 of the bracket 190 and at the other end to a pin 199 which projects from the shaft 193 through a slot 200, formed for the purpose in the bracket 190. The handle may be drawn down to its operated position and released and it will be restored to normal position by the spring 198. As shown for example in Figs. 19 and 43, the shaft 193 has projecting from its right-hand end a segmental gear 201 which meshes with a gear wheel 202 on the left-hand face of the frame plate 71 (Figs. 9 and 19). The gear wheel 202 has a hub 203 which is journaled in an opening in the frame plate 71, and said gear wheel and its hub are also journaled on the left-hand end of a rod 204, the right-hand end of which, as shown for example, in Fig. 33, is rigidly secured to the frame plate 72 by a screw 205 which passes through said frame plate and is threaded into the end of said rod. The rod 204 is held against endwise and rotary motion by its rigid connection with the frame plate 72 and it is supported at its left-hand end by the hub of the gear wheel 202. Said gear wheel is provided from slipping off of said rod by the head of a screw 206 (Fig. 19) which is threaded into the end of the rod. A gear wheel 207 has an elongated hub which is loosely mounted on the rod 204 and which is held against motion toward the right by a collar 208 which is rigidly secured to said rod by a set screw. In operation the gear wheels 202 and 207 are rigid with each other, their hubs together constituting in effect a sleeve which is journaled on the rod 204; but for convenience in assembling the machine the hub of the gear wheel 207 is formed with a clutch member 209 which, as shown for example in Figs. 3 and 19, interlocks with a corresponding clutch member 210 formed on the end of the hub of the wheel 202. In the construction of the machine, the wheel 207 and some other parts which the rod 204 supports are mounted on the rod before it is put in place in the machine, after which the wheel 202 is placed in position and is secured in position by the screw 206. As shown in Figs. 3 and 19, the gear wheel 207 meshes with a gear wheel 211 which is journaled on the shaft or rod 149 and the hub of which is separated from the hub of the wheel 102 by a washer 212. A disk 213 is secured to the right-hand face of the gear wheel 211 by screws 214 and on the right-hand face of this disk a pawl 215 is pivoted on a shouldered and headed screw 216 which is threaded into the disk. The pawl 215 is pressed by a spring 215' (Fig. 42) toward the ratchet wheel 85 which it engages in such manner that when the operating handle is depressed, said ratchet wheel and the shaft 75 are turned toward the front of the machine, but when the operating handle is released and returns to normal position the pawl moves idly over the ratchet wheel. It will thus be seen that the shaft 75 is always turned in the same direction. The train of gearing which connects the operating handle with the disk 213 is designed to give to the shaft upon each operation of said handle a rotation of sufficient extent to add nine upon any register wheel and also to effect any transferring which may be necessary. The precise distance through which the shaft is turned is immaterial, provided it is turned far enough, the frictional connection between the shaft and the register wheels being such that any additional rotation of the shaft beyond what is necessary does not affect the wheels. For this reason, it will be perceived, no harm will be done by depressing the operating handle more than once between successive additions.

In order to insure that the shaft 75 shall not turn backward even to a slight extent, I have provided a friction device which prevents any motion of this shaft, except such as is positively imposed upon it by the operating mechanism. As best shown in Figs. 33, 37 and 45, the right-hand end of the shaft 75 is reduced and is journaled in a nut 217 which is threaded through an opening in the frame plate 72. At its inner end this nut engages the nut 92 and thus prevents endwise motion of the shaft 75 toward the right. The shaft 75 may be adjusted endwise by adjusting the nut 217, which is provided in its outer face with holes 218 (Fig. 37) in which a tool may be inserted for this purpose. The nut 217 is secured in adjusted position by a lock nut 219. The shaft 75 is prolonged beyond its bearing and it has a collar 220 secured on its outer end by a set screw 221. A three armed spring washer 222 (Figs. 37 and 45) is compressed between the collar 220 and a washer 223 which may be made of fiber or similar material and which is pressed by the spring 222 against the face of the lock nut 219. The resiliency of the spring washer 222 draws the nut 97 into frictional engagement with the nut 217, and thus prevents any accidental rotation of the shaft.

In order to transfer from one denomination to another, the stop 103 is made movable into and out of position to engage and arrest the stop pins 76. Each of the stops 103 consists of the end of an arm 225 of a transfer lever, which is best shown in Figs. 3, 4, 5, 6, 7 and 41. Each of these levers has the form of a bell crank having the vertically disposed arms 225 and the horizontally disposed arms 226 and hubs 227 which are loosely mounted on a frame rod 228 which is secured at its ends to the frame plates 71 and 72 by screws 229 (Fig. 33), which pass through said frame plates and are threaded into the ends of said rod. The rod 228 lies above and behind the series of register wheels and one of the transfer levers has its arms projecting into each of the spaces between two consecutive register wheels. As shown in Fig. 3, each of the arms 225 has its lower end bent as shown at 230 to bring the end of said arm into the path of the pins 76. The arm 226 of the lever is bent to the right and the end thereof is formed with a cam portion 231 which stands in the path of two transfer pins 232 which project from the left-hand face of the next register wheel to the right. Two such transfer pins are used in the present case for the reason that two series of digits are inscribed on the periphery of each of the register wheels. The construction is such that when any register wheel passes from its nine to its zero position, one of its pins 232 lifts the cam end 231 of the arm 226 of the transfer lever and thus moves the arm 225 of said lever toward the front of the machine and moves the stop 103 out of the path of the stop pins 76 of the next wheel of higher denomination. When the stop end 103 of the lever 225 is moved out of the path of the pins 76, a second stop surface 233 of said arm moves into the path of said pins. The stop surfaces 103 and 233 are a distance apart equal to the distance from one pin to the next, so that if one of the pins 76 is in engagement with the stop 103 at the moment when said stop is moved to inoperative position by a transfer pin 232 of another wheel, that pin 76 which was in engagement with said stop, is free to move a unit's distance, when it will encounter the second stop 233. If, on the other hand, the wheel 74 of higher denomination is itself in motion at the moment when the transfer lever is moved, then the first pin 76 which stands in operative position will not be arrested by the stop 103 but will move an additional space and will be arrested by the stop 233, so that the transfer takes place equally well whether the wheel of higher denomination is in motion at the time or not.

In order to hold the transfer levers in either their normal or their operated positions, said levers are frictionally mounted on the rod 228. As best shown in Fig. 41, the hub 227 of each of the transfer levers is in engagement with a collar 234 which is fixedly mounted on the rod 228 by a set screw 235. A spring 236 coiled about the rod 228 is compressed between one of the collars 234 and a washer 237 which is loosely mounted on the rod 228. The hub of each transfer lever is, therefore, in frictional contact with one of the collars 234 on one side and with one of the washers 237 on the other, such contact being insured by the tension of the spring 236. In order to prevent the washers 237 from rotating on the rod 228, each of said washers is formed as shown in Fig. 4, with a notch in its rear edge into which fits a plate or strip 238 which is secured at its ends to the frame plates 71 and 72 (Fig. 50). The construction is such that the transfer levers tend to remain in either of the positions to which they may be set. Said levers are set to operated position by the pins 232 and are restored to operative position by a yoke-shaped restoring frame 239, the arms of which are pivoted on the rod 228. The yoke bar of said restoring frame normally stands in the position shown for example in Fig. 7, just above the several arms 226 of the transfer levers, and it is rocked downward and toward the front of the machine to restore said levers to normal position by means which are actuated by the operating handle and which will be presently described. Said frame is restored to normal position by a spring 239' (Figs. 3 and 4) which is wound around the rod 228 and presses at one end against the yoke bar and at the other against the strip 238. Each of the arms 225 has just below the stop face 233 thereof an arm 240 (Fig. 6) which is bent outward to form a cam, so that when the transfer lever is restored to normal position, this arm cams that stop pin 76 which is in engagement with the stop 233 to inoperative position. At the same time the stop 103 moves into the path of the next succeeding stop pin 76. All of the other pins which pass the transfer lever are moved to inoperative position by the keys. It will thus be seen that all of the pins which pass this lever stand in inoperative position; that is to say, they are flush with the right-hand face of the register wheel and project from the left-hand face thereof. The right-hand arm of the yoke frame 239 is pivoted on the shaft 228 just inside the frame plate 72, as shown in Fig. 3. The left-hand arm of said frame has an elongated hub 241, on the right-hand end of which is fixed an arm 242 (Figs. 8 and 9). This arm lies on the left-hand side of the gear wheel 207 and the portion of the hub 241 which is opposite the periphery of said gear wheel is flattened, as shown in Fig. 19, to avoid interfering with said wheel. The arm 242 has an off-set bend 243, as shown in Fig. 19, and the upper edge of the end of said arm forms a cam which lies in the path of an anti-friction roller 244 which is mounted on a shouldered and headed screw 245, which is threaded into the left-hand face of the gear wheel 207. This anti-friction roller is shown in its normal position in Fig. 9; but when the operating handle is depressed, the rotation of the wheel 207 brings the roller to the position shown in Fig. 8 where it depresses the arm 242 and the yoke frame 239 and restores to normal position any transfer levers which may have been operated. The parts are so designed that the depression of the frame 239 takes place after the rotation of the register wheels is completed.

From the foregoing description it will be understood that all of the stop pins 76 which pass the transfer lever are in inoperative position and also that it is necessary that these pins shall have been restored to operative position by the time they reach the ninth shaft 99. The pins are thus restored to operative position by a series of cam arms 250 (Figs. 32 and 33), the hubs of which are mounted on the frame rod 204 to which they are fixed by set screws 251. These arms have the segmental outline shown by dotted lines in Fig. 32, and as will be seen by reference to Fig. 33, the upper end of each of said arms stands far enough from the register wheel to clear the projecting ends of the stop pins and the lower end of the arm stands close to the register wheel. The intervening inclined portion of the arm constitutes a cam which forces the pins to operative position as the wheel is turned.

As will be understood from the foregoing description, the operation of the numeral keys as the carriage traverses that portion of its travel which is set apart for the adding column merely sets the stop pins in the several adding wheels. The operation of said wheels is performed by the operating handle. In order to prevent the operator of the machine from forgetting to actuate the operating handle, I have provided means for automatically locking the numeral keys when the carriage has reached the end of the adding column. As shown, for example, in Fig. 30, the left-hand ends of the key operated slides 110 stand opposite a series of slots 252 in a slidably mounted locking block 253, so that said slides are free to move to the left under the impulse of the keys; but if said block be moved toward the front of the machine to the position shown in Fig. 31, the ends of the slides will be locked against operation by the solid portions of said block. As best shown in Figs. 19 and 25, the block 253 is mounted in a yoke-shaped frame of sheet metal 254 which is set into a slot or notch in the right-hand edge of the post 190, to which it is secured by a screw or screws 255. The block is guided in its to and fro motion in its frame by pins 256 which project upward from the lower plate of said frame into a longitudinal slot 257 in the bottom of the block. The block 253 is held against accidental displacement by a headed friction pin 258 (Fig. 31) which is loosely mounted in a hole in the left-hand face of the block, which hole is formed with an annular shoulder, as shown in said Fig. 31. A spring 259 is coiled about the pin 258 and is compressed between said annular shoulder and the head of the pin and presses the latter into frictional engagement with the left-hand wall of the frame 254. To the upper side of the block 253 is secured the base 260 of a slotted bracket 261, in the slot of which a lever 262 is pivoted on a screw 263 having an elongated head. As shown, for example, in Fig. 20, a hollow stud 264 projects from the left-hand face of the wheel 102 through a segmental slot 265 in the frame plate 71. As shown in Fig. 29, the longitudinal opening in this stud is shouldered and in said opening is loosely mounted a headed pin 266. A spring 267 is coiled about the reduced portion of this pin between the head of the pin and the annular shoulder in the hollow stud, and said spring tends to press said pin toward the left. A second pin 268 projects from the head of the pin 266 through an elongated slot 269 in the hollow stud 264. This pin limits the to and fro motion of the pin 266 and also prevents said pin from rotating in its socket. The end of the pin 266 is reduced on two sides, leaving a wing or lug 270 which projects beyond the end of the hollow stud. The lever 262 has a horizontally disposed arm which projects toward the back of the machine and the end of which is formed in two steps 271 and 272. Said lever may be rocked about its pivot to the position shown in Fig. 21 in which the lug 270 does not touch said lever, or into the position shown in Fig. 22 in which said lug engages the step 271, or into a third position, shown in Fig. 23, in which said lug engages the end 272 of the lever. As shown in Fig. 28, one side of the bracket 261 has a flat spring 273 secured thereto by a screw 274. As shown in Fig. 26, the free end of this spring has fixed thereon a pin 275 which is formed with a conical end. This pin projects through an opening in the bracket 261 and its conical end is adapted to engage in one or another of three depressions 276 (Fig. 27) formed in the face of the lever 262 and thus yieldingly retain said lever in either of its three positions. As shown in Fig. 21, a bracket 277 is secured to the frame 254 by screws 278. On the upper end of this bracket is mounted a segmental scale plate 279 which, in Fig. 20, is shown in elevation and a face view of which is shown in projected position in said figure. The lever 262 has an upwardly extending arm by which said lever may be manipulated, and from which a pin 280 projects in such a position as to constitute an index for the scale plate 279. The position of the index 280, corresponding to the position of the lever shown in Fig. 21, is marked on the scale plate with characters to indicate that the machine may be unlocked. The position of said index corresponding to the position of the lever shown in Fig. 22, is marked on said scale plate with characters to indicate that the mechanism is set to write decimals; and the third position of said index is marked to indicate that the mechanism is set to lock the machine after the unit's columns, so that the decimal columns cannot be used. When in the motion of the wheel 102 under the control of the carriage, the lug 270 encounters either of the stop portions of the lever 262, upon the next step of the carriage, and the denomination selecting mechanism said lug operates the lever and moves the stop block 253 to the position shown in Fig. 31 and thus locks the slides 110 against operation. If the lever stands in the position shown in Fig. 21, this automatic locking operation does not take place. If said lever stands in the position shown in Fig. 22 the keys are locked after the operation of adding on the cents register wheel; and if the parts stand in the position shown in Fig. 23, the keys are locked when the carriage reaches the letter space position assigned to the decimal point. The lever is set in this position when it is desired to write and add whole numbers without the use of decimals. When the lever is in this position, it arrests the wheel 102 before the pins 186 and 187 come into engagement, and the next succeeding step of the carriage cams the dog 174 out of the notch 173.

A bracket or handle 281 is secured to the locking block by a screw 282. The keys may be unlocked by hand by manipulating this handle. I have, however, provided means for automatically unlocking the keys when the operating handle is depressed. In order to effect this result the pin 266 is pressed back into its socket against the tension of its spring 267 until the lug 270 is out of the path of the lever 262, and the locking block 253 is then pushed toward the back of the machine to its normal position. As shown, for example, in Fig. 19, an annular plate 283 is secured to the segment 201 by screws 284, and surrounds the cylindrical upper end of the bracket 190 without touching said bracket. This plate is spaced some distance from said segment by sleeves or washers 285 which surround said screws. Projecting from the lower right-hand face of said annular plate is a segmental wedge-shaped flange 286 (Figs. 3 and 24), the right-hand cam edge of which, when the operating handle is depressed, engages the pin 268 and cams said pin to the right, thus moving the lug 270 out of the path of the lever 262. A pin 287 projects from the periphery of the plate 283 in such position that when the operating handle has nearly completed its positive stroke, said pin engages the elongated head of the screw 263 and moves the locking block to its normal position. If the operator forgets to depress the operating handle, he will be reminded of the fact by finding the numeral keys locked against operation. He will also find them so locked if he has failed to impart to said handle its full down stroke. In case it is desired to unlock the keys by hand without operating the operating mechanism, the lever 262 will first be moved to its unlocking position and the locking block may then be pressed to unlocking position by the finger piece 281. It will also be perceived that the keys may be locked at any time by moving the locking plate to locking position by means of this finger piece.

I have provided means whereby the register wheels may be set to zero by turning the driving shaft 75 by means of the operating handle, special devices being provided for controlling the stop pins and arresting the wheels at their zero position in this operation. As shown, for example, in Fig. 20, each of the frame plates 71 and 72 has formed in its rear edge a notch 290 and a slot 291. As shown in Fig. 50, a bar 292 is loosely mounted in the notches 290 and a bar or strip 293 rests on the bar 292 and lies in the slots 291. Each of these bars is capable of endwise sliding motion. As shown in Figs. 44 and 50, the bar 292 is formed in its rear face with a longitudinal channel, and a spring 294, bent as shown in Fig. 50, has its ends resting in frictional contact with the bottom of this channel, and said spring is held against motion with the bar and is pressed against said bar by a pin 295 which projects from a frame plate 296 and which lies in a U-shaped bend in the spring. Friction imposed by this spring prevents accidental displacement of the bar but permits the bar to slide under the impulse of a sufficient force. The bar 293 has its end, which stands outside the frame plate 72, bent up to form a finger piece 297. Guide pins 298 (Fig. 46) extend downward from the bar 293 into slots formed in the upper flange of the bar 292. The bar 293 is drawn toward its normal right-hand position, shown in Fig. 50, by a spring 299 which is connected at one end to the frame plate 72 and at the other end to a pin rising from said bar. The motion of the bar 292 under the impulse of the spring 299 is limited by the upturned left-hand end 300 of said bar, which engages the frame plate 71. The forward edge of the bar 293 is formed with a series of notches having cam edges 301 (Fig. 49) which lie in such position that when the bar is moved toward the left by pushing on the finger piece 297, the cams 301 move all of the transfer levers to their operated positions, as shown in Fig. 44. A pin 302 rises from the top of the bar 292 outside of the frame plate 71 in such position that after the transfer levers have all been moved to operated position, the end 300 of the bar 293 engages said pin and pushes the bar 292 a short distance to the left. The motion of said bar 292 in this direction is limited by the head of a screw 303 (Fig. 46) which is threaded into the right-hand end of said bar and which engages the frame plate 72. As shown, for example, in Figs. 19, 44 and 50, a series of brackets 304 are set in transverse slots in the front face of the bar 292, to which they are secured by screws 305. Each of these brackets extends below the bar 292 and one edge thereof is bent toward the front of the machine, as shown at 306 in Fig. 44, and the forward edge of this portion is bent to the left and the edge thereof is inclined to form a cam 307. There is one of these cams for each register wheel and they normally stand in the position shown in Fig. 50, just out of the paths of the stop pins 76; but when the bar 292 is pushed to the left in the manner which has been described, these cams stand in the paths of the pins, so that when the register wheels are turned by depressing the operating handle, each pin, as it passes one of the cams, will be moved to inoperative position. These parts are shown in Fig. 50 in their normal position. In Fig. 47 the bar 293 has been pushed far enough to take up the lost motion between the end 300 of said bar and the pin 302. By this time the transfer levers are all moved to the position shown in Fig. 44. In Fig. 46 the parts are shown in full operated position, the bar 292 being pushed to its left-hand position with the cams 307 in position to engage the pins 76. When the pressure on the finger piece 297 is released, the bar 293 is withdrawn to its normal position by its spring 299, but the bar 292 remains in its operated position.

In order to arrest the register wheels at zero, a rock shaft 308 (Figs. 44 and 48) is journaled at its ends in the frame plates 71 and 72 in front of the register wheels. A strip of sheet metal 309 is seated in a longitudinal groove in this shaft, and it has projecting from its edge a series of arms 310, the ends of which are bent downward to form stops 311. There is one of these arms for each register wheel and the rock shaft normally stands in such position that the stop ends 311 of said arms are out of the paths of the transfer pins 232, as shown in Fig. 44; but the arms may be depressed as shown in dotted lines in Fig. 45 to such position that the ends 311 thereof stand in position to arrest the transfer pins 232 when the register wheels are in zero position. In order to thus rock the shaft 308, said shaft has mounted on the right-hand end thereof outside of the frame piece 72 an arm 312, which has bent off therefrom a finger piece 313. A spring 314 is coiled about a screw 315 which is threaded into the frame plate 72 and which is provided with a washer to hold the spring in position. One end of this spring presses upward on the finger piece 313 to hold the rock shaft in normal position and the other end engages a screw 205. In order to limit the motion of the shaft 308 in both directions, the arm 312 is forked as shown in Fig. 45, and a stop pin 317 projects from the frame plate 72 between the arms of said fork. The operation of setting the register wheels to zero is as follows:— The operator pushes the finger piece 297 in as far as it will go, thus camming all of the transfer levers to operated position and moving the bar 292 and the cams 307 to the position shown in Fig. 46. He then depresses the finger piece 313 to move the stops 311 into the paths of the transfer pins 232, and while holding these stops in this position operates the operating handle. The shaft 75 is turned by the operating handle, thus turning all the register wheels until they are arrested by the stops 311, the pins 76 which pass the transfer levers being moved to inoperative position one after another by the cams 307. As shown in Fig. 50, the annular plate 283 has a lug 318 projecting from its periphery and having its right-hand face forming a cam which, when the operating handle is nearly depressed, engages an anti-friction roller 319 which is journaled on a headed and shouldered screw which projects from the front face of the bar 292. The cam 318, engaging this anti-friction roller, restores the bar 292 to its normal position and the transfer levers are all restored to normal position by the restoring frame 239 in the manner which has been hereinbefore described.

For convenience in assembling the machine, a slot 320 (Fig. 45) is cut from the edge of the frame plate 72 to the opening in which the shaft 308 is journaled. The shaft is put into the machine by inserting its left-hand end into the opening in the frame plate 72 and the shaft is pushed into place longitudinally, it being turned into such a position that the plate 309 slips through the slot 320. The shaft is turned down to its normal position after being inserted in the machine.

What I claim as new and desire to secure by Letters Patent, is:—

1. In a combined typewriting and adding machine, the combination with the carriage of the typewriting mechanism, of spring means for moving said carriage; a denomination selecting device for the adding mechanism; a spring drum for said denomination selecting device; means connecting said spring drum to said carriage, and means for varying the connection between said spring drum and said denomination selecting device to vary the position of the adding column in the line of writing.

2. In a combined typewriting and adding machine, the combination of a carriage for the typewriting machine; a denomination selecting device for the adding mechanism; a spring drum for actuating said typewriting machine carriage; a second spring drum for said denomination selecting device; means connecting said second spring drum to said carriage, whereby said second spring drum assists in propelling said carriage; means for adjusting the tension on said spring drums, and means for varying the connection between said spring drum and said denomination selecting device to vary the position of the adding column in the line of writing.

3. In an adding machine, the combination of a driving shaft; a series of register wheels, each independently frictionally connected with said driving shaft; an operating handle and connections for turning said driving shaft in one direction; and a restoring spring for said operating handle.

4. In a combined typewriting and adding machine, the combination with the numeral keys, the printing means actuated thereby, the carriage, and the motor for said carriage, of key controlled adding mechanism including a rotatable member which rotates in unison with the travel of the carriage; a second rotatable member which rotates in unison with said first mentioned rotatable member but which is adjustable with relation thereto; denomination selecting means controlled by said second rotatable member; and a special motor for actuating said denomination selecting means.

5. In a writing and adding machine, the combination of a carriage; a step by step feed device for said carriage; a series of keys and printing means actuated thereby; means for automatically adding numbers written by said printing means, said adding means comprising a denomination selecting device and a special motor for said denomination selecting device; and means whereby the operation of said denomination selecting device by its motor is controlled by said step-by-step device.

6. In a writing and adding machine, the combination with the keys; printing means actuated by said keys; a carriage; and an escapement mechanism for controlling the feed of said carriage; of means for automatically adding numbers written by said printing means, said means comprising a denomination selecting device; a special motor for said denomination selecting device; and means whereby said motor is controlled by said escapement mechanism.

7. In a writing and adding machine, the combination with a series of keys, key controlled printing means, a carriage, and an escapement mechanism for controlling said carriage; of an adding mechanism comprising a denomination selecting device; a special motor for said denomination selecting device; means whereby said motor is controlled by said escapement mechanism; and means adjustable to vary the point in the line of writing at which said special motor is brought into operation.

8. In a writing and adding device, the combination with the keys, the key controlled printing means, and the carriage; of mechanism for automatically adding numbers written by said printing means, said mechanism comprising a denomination selecting device; a motor for said denomination selecting device; and means for connecting said motor with said carriage at a predetermined point in the line of writing.

9. In a writing and adding device, the combination with the keys; the key controlled printing means, and the carriage; of mechanism for automatically adding numbers written by said printing means; said mechanism comprising a denomination selecting device; a motor for said denomination selecting device; and means for disconnecting said motor from said carriage at a predetermined point in the line of writing.

10. In a writing and adding device, the combination with the keys, the key controlled printing means, and the carriage; of mechanism for automatically adding numbers written by said printing means, said mechanism comprising a denomination selecting device; a motor for said denomination selecting device; and means for connecting said motor with and disconnecting it from said carriage at predetermined points in the line of writing.

11. In a writing and adding device, the combination with the keys, the key controlled printing means; and the carriage; of mechanism for automatically adding numbers written by said printing means, said mechanism comprising a denomination selecting device; a motor for said denomination selecting device; means for connecting said motor with said carriage at a predetermined point in the line of writing; and means for varying the point in the line of writing at which said motor is connected with said carriage.

12. In a writing and adding device, the combination with the keys, the key controlled printing means, and the carriage; of mechanism for automatically adding numbers written by said printing means, said mechanism comprising a denomination selecting device; a motor for said denomination selecting device; means for disconnecting said motor from said carriage at a predetermined point in the line of writing; and means for varying the point in the line of writing at which said motor is disconnected from said carriage.

13. In a writing and adding device, the combination with the keys, the key controlled printing means, and the carriage; of mechanism for automatically adding numbers written by said printing means, said mechanism comprising a denomination selecting device; a motor for said denomination selecting device; means for connecting said motor with and disconnecting it from said carriage at predetermined points in the line of writing; and means for varying the points in the line of writing at which said motor is connected with and disconnected from said carriage.

14. In a writing and adding machine, the combination of a series of register wheels; a group of keys common to all of said register wheels; a paper carriage; a denomination selecting device for said register wheels; and a dog and a part to which said dog becomes coupled for connecting said denomination selecting device with said carriage through a part only of the motion of said carriage.

15. In a writing and adding machine, the combination of a series of keys including numeral keys; printing means and a carriage controlled by said keys; a series of register wheels; a denomination selecting device for connecting said numeral keys with one after another of said register wheels; a member connected to said carriage to move in unison therewith; and a dog and a part to which said dog becomes coupled for connecting said denomination selecting device with said member through a part only of its motion.

16. In a writing and adding machine, the combination with the numeral keys, the printing means actuated thereby, and the carriage, of adding mechanism having a rotary member, the rotation of which is controlled by the carriage; a movable part which moves with said rotary member during a portion only of its rotary movement; and means controlled by said movable part for bringing one denomination of said adding mechanism after another under the control of the numeral keys.

17. In a writing and adding machine, the combination with the numeral keys, the printing means actuated thereby and the carriage, of mechanism for adding numbers written by said printing means in a plurality of denominations, said adding mechanism including a rotary member which rotates in unison with the travel of the carriage; a movable part which moves with said rotary member during a portion only of its rotary movement; means for varying the portion of said rotary movement during which said movable part moves with said rotary member; and means controlled by said movable part for bringing one denomination of said adding mechanism after another under the control of the numeral keys.

18. In a writing and adding machine, the combination with the numeral keys, the printing means actuated thereby and the carriage, of mechanism for automatically adding numbers written by said numeral keys in a plurality of denominations, said adding mechanism including a rotary member which rotates in unison with the travel of the carriage; a movable part which moves with said rotary member during a portion only of the rotary movement thereof; means controlled by said movable part for bringing one denomination after another of said adding mechanism under the control of the keys; and means for adjusting the relation of said rotary member to said carriage, to vary the position of the adding column in the line of writing.

19. In a writing and adding machine, the combination with the numeral keys, the printing means actuated thereby and the carriage, of mechanism for automatically adding numbers written by said keys and printing means in a plurality of denominations, said mechanism including a rotatable member connected to the carriage to rotate in unison with the travel thereof; a movable part; means for coupling said movable part to and uncoupling it from said rotatable member whereby said part is moved with said rotatable member during a portion only of the movement thereof; key controlled devices; means controlled by said movable part for bringing one denomination after another of said adding mechanism into coöperative relation with said key controlled devices; and means for varying the relation of said rotary member to said carriage to vary the position of the adding column in the line of writing.

20. In an adding machine, the combination with the numeral keys, of a series of registering elements; a series of rotatable and longitudinally movable shafts one for each numeral key, each of said shafts having a spirally arranged series of arms, one for each of said registering elements; means for rotating said shafts in unison to select the denomination; means connecting said shafts to said keys to impart a reciprocatory motion to said shafts when the keys are depressed, and digit determining means operated by such reciprocatory motion.

21. In a writing and adding machine, the combination of a group of numeral keys; printing means actuated thereby; a carriage; a series of rotary and longitudinally movable members one for each key; means for reciprocating said members when the keys are depressed; means for rotating said members in accordance with the travel of the carriage; a series of registering elements; and spirally arranged means carried by each of said rotary and reciprocatory members for controlling said registering elements.

22. In a machine for adding numbers in a plurality of denominations, a member having a rotary motion to different positions to determine the denomination in which the digit is to be added and a reciprocatory motion to set up the digit.

23. In a machine for adding numbers in a plurality of denominations, the combination with settable devices for each denomination, of a member having a rotary motion to different positions to bring it into coöperative relation with the settable devices of one denomination or another, and a reciprocatory motion to actuate the settable devices of the selected denomination.

24. In a machine for adding numbers in a plurality of denominations, the combination with settable devices for each denomination, of a member having a series of spirally arranged parts one for each denomination, said member having a rotary motion to different positions to bring one or another of said parts into coöperative relation with its settable devices, and a reciprocatory motion to actuate said settable devices.

25. In a machine for adding numbers in a plurality of denominations, a series of members one for each digit to be added, each member having a rotary motion to different positions to determine the denomination in which the digit is to be added, and a reciprocatory motion to set up the digit.

26. In a machine for adding numbers in a plurality of denominations, the combination of a member having a rotary motion to different positions to determine the denomination in which the digit is to be added, and a reciprocatory motion to set up the digit; keys controlling the reciprocatory motion to said member, and a key controlled step by step device for controlling the rotary motion of said member.

27. In a machine for adding numbers in a plurality of denominations, the combination of a series of members, one for each digit to be added, each member having a rotary motion to different positions to determine the denomination in which the digit is to be added, and a reciprocatory motion to set up the digit; of a group of keys, one for each digit; means whereby the reciprocatory motion of said members is controlled by said keys; and a key controlled step-by-step device for controlling the rotary motion of said members.

28. In a machine for adding numbers in a plurality of denominations, the combination with settable devices for the several denominations, said settable devices being arranged side by side; of a series of members extending across said series of settable devices, each of said members being provided with a series of spirally arranged parts, one for each denomination, and each of said members having a rotary motion to different positions to bring one or another of said parts into coöperative relation with its settable devices and a reciprocatory motion to actuate said settable devices; a series of keys controlling the reciprocatory motion of said members; and a key controlled step-by-step device controlling the rotary motion of said members.

29. In a machine for adding numbers in a plurality of denominations, the combination of settable devices for the several denominations; a series of shafts, one for each digit; a series of spirally arranged arms on each of said shafts, one arm for each denomination; means for turning said shafts in unison to different positions to bring the arms of the several shafts corresponding to one or another of the denominations into operative position simultaneously; and means for imparting an endwise motion to said shafts to actuate the settable devices of the selected denomination.

30. In a machine for adding numbers in a plurality of denominations, the combination of a series of keys; a series of members each having a rotary motion to different positions to determine the denomination in which the digit is to be added and a reciprocatory motion to set up the digit; means connecting each of said members with one of said keys to impart the reciprocatory motion to said member by the depression of said key; key controlled step-by-step devices for imparting said rotary motion to said members; a series of registering elements; and means whereby the reciprocatory motion of said members determines a digit to be added upon a particular one of said registering elements determined by the rotary position of said members.

31. In a machine for adding numbers in a plurality of denominations, the combination of a series of registering elements each carrying a series of settable digit determining members; a series of shafts, one for each digit, each of said shafts having a series of spirally arranged parts, one for each registering element; step-by-step devices for turning said shafts to different positions to bring the spirally arranged parts thereof into coöperative relation with the digit determining members of one of said registering elements after another; a series of keys one for each digit; and means for imparting a reciprocatory motion to said shafts upon the depression of said keys.

32. In an adding machine, the combination of a series of register wheels; means for turning said register wheels; means for normally holding each of said register wheels against rotation; a shaft having a series of spirally arranged arms, one for each register wheel; means for rotating said shaft to different positions to bring one or another of said arms into coöperative relation with the holding means of one or another of said register wheels; and means for imparting an endwise motion to said shaft to operate said holding means and release said wheel.

33. In an adding machine, the combination of a series of register wheels each carrying a series of settable stops; a series of setting devices for setting said stops, said setting devices being movable in one direction to select a register wheel and in another direction to set the stops; a series of keys, one for each setting member; and means whereby any setting member, except the one of lowest numerical value, operates all of the setting members of lower numerical value than itself.

34. In an adding machine, the combination of a series of register wheels; digit determining members carried by said register wheels; devices for setting said digit determining members; and a single restoring spring for all of said devices.

35. In a writing and adding device, the combination of a series of keys; printing means and a carriage controlled by said keys; a series of register wheels; a series of settable digit determining members for each of said register wheels; a series of setting members one for each digit; a denomination selecting device for imparting a rotary motion to said setting members in unison; key controlled means for imparting a longitudinal motion to said setting members to operate said digit determining members; and a spirally arranged series of setting elements on each of said setting members, certain of said setting elements being spaced apart a greater angular distance than the others in order to leave a space for punctuation.

36. In an adding machine, the combination of a series of register wheels, means including keys for controlling said register wheels to add numbers in a plurality of denominations, and means for rendering the register wheels of certain denominations inoperative by said keys while permitting such operation of register wheels of other denominations.

37. In an adding machine, the combination of a series of register wheels; means for operating said register wheels to add whole numbers and decimals; and means for preventing the operation of those register wheels on which decimals are added.

38. In an adding machine, the combination of a series of register wheels; a group of keys common to said register wheels; a denomination selecting device for connecting said keys with one after another of said register wheels; and means for locking the keys and preventing said denomination selecting device from connecting said keys with certain of said register wheels.

39. In an adding machine, the combination of a series of registering elements; a group of keys common to said registering elements; key controlled setting devices; means for bringing said setting devices into coöperative relation with one after another of said registering elements; means for operating said registering elements after a number has been set up by the keys; means for locking said keys after a number has been set up; and means whereby said operating means releases said lock.

40. In a writing and adding machine, the combination with the numeral keys, the printing means actuated thereby and the carriage, of adding mechanism including denomination selecting devices controlled by said carriage during a portion of the travel thereof, setting devices actuated by the keys; means for locking the keys when the carriage has passed that portion of its travel during which the adding mechanism is operative; and means for operating said adding mechanism in accordance with the numbers set up thereon and for releasing said locking means.

41. In an adding machine, the combination of a group of keys; key operated means for setting up the digits of a number in a plurality of denominations; a denomination selecting device for connecting said key operated devices to one denomination after another; a lock for said keys operated by said denomination selecting device; and an operating mechanism for said adding mechanism arranged to release said lock.

42. The combination of a group of keys; a series of registering elements; key operated setting devices; a denomination selecting device for rendering said setting devices operable to set up digits in one denomination after another; a lock for the keys operated by said denomination selecting device; and means for changing the denomination at which said keys are locked.

43. In a writing and adding machine, the combination with the numeral keys, the printing means actuated thereby and the carriage, of adding mechanism; key controlled means for setting up numbers in said adding mechanism; means connected to the carriage to render said setting-up devices operative at a predetermined portion of the line of writing; a lock for said keys; means for operating said lock when said carriage has reached the end of the portion of its travel during which the setting-up mechanism is operative; and means for operating the adding mechanism in accordance with the numbers set up thereon, said means being also arranged to release said lock.

44. In an adding machine, the combination of a group of keys; a series of register wheels; devices whereby the depression of said keys one at a time sets up the digits of a number one at a time; means brought into operation after the number has been set up to operate the register wheels; and means controlled by said operating means for preventing a second operation of the setting up devices.

45. In a writing and adding device, the combination of a series of keys including numeral keys; printing means controlled by said keys; means for automatically adding numbers written in a column by said printing means; and means for locking the numeral keys when a number has been written in said column.

46. In a writing and adding device, the combination of a series of keys including numeral keys, printing means controlled by said keys; adding mechanism; means for bringing said adding mechanism under the control of the numeral keys; and means for locking said numeral keys after a number has been written while said adding mechanism is under the control of said numeral keys.

47. In a combined typewriting and adding device, the combination of a series of keys including numeral keys and other keys; printing means controlled by said keys; adding mechanism controlled by the numeral keys; and means for automatically locking the numeral keys without affecting the other keys, at a pre-determined point in the line of writing.

48. In a combined typewriting and adding machine, the combination of a series of keys including numeral keys and other keys; printing means controlled by said keys; adding mechanism controlled by said numeral keys; means for automatically locking said numeral keys at a pre-determined point in the line of writing; and means whereby the point in the line of writing at which the numeral keys are locked may be varied.

49. In an adding machine, the combination of an operating handle having a to and fro motion; a rotary driver operated in one direction by said operating handle; and a series of register wheels frictionally driven by said rotary driver.

50. In an adding machine, the combination of an operating handle having a to and fro motion; a rotary shaft connected to said handle and rotated thereby in one direction; and a series of register wheels mounted on said rotary shaft and each independently frictionally driven thereby.

51. In an adding machine, the combination of a series of register wheels; a driver to which said register wheels are connected by frictional contact; an operating handle; and a pawl and ratchet connection between said operating handle and said driver.

52. In an adding machine, the combination of a series of register wheels; a driver to which said register wheels are independently frictionally connected; a to and fro moving operating handle; and means whereby said operating handle turns said driver in only one direction.

53. In an adding machine, the combination of a series of register wheels; a driver having independent frictional connection with each of said register wheels; transfer devices for said register wheels; an operating handle; means operated by said handle for imparting to said driver a predetermined extent of rotation; a restoring frame for said transfer devices; and means operated by said operating handle for actuating said restoring frame.

54. In an adding machine, the combination of an operating handle having a to and fro movement; a rotary driver operated by said handle in one direction; a series of register wheels each frictionally driven by said driver; and a friction device for preventing backward rotation of said driver.

55. In an adding machine, the combination of a driver; a series of register wheels each independently frictionally connected with said driver; means for rotating said driver in one direction; and a frictional retaining device for preventing accidental motion of said driver.

56. In an adding machine, the combination of a rotary shaft, a series of collars and disks rigidly mounted on said shaft; a series of register wheels journaled on said collars; and a series of springs pressing said register wheels into frictional engagement with said disks.

57. In an adding machine, the combination of a driving shaft; a series of collars and friction disks rigidly mounted on said shaft; a series of register wheels journaled on said collars and engaging said friction disks, a second series of disks also rigidly mounted on said shaft and having openings therein; rollers loosely mounted in said openings; and a series of springs pressing said rollers into frictional engagement with said register wheels.

58. In an adding machine, the combination of a series of register wheels; a shaft having a series of arms coöperating with said register wheels; and a bearing for said shaft having a slot through which said arms may be slid in assembling the machine.

59. In an adding machine, the combination of a series of register wheels, each carrying a series of settable digit determining members; a series of setting members common to said series of register wheels; a series of keys, one corresponding to each setting member; means for bringing all of said setting members simultaneously into coöperative relation with one of said register wheels after another; and means whereby the depression of any key results in the operation of the setting member corresponding to the key depressed and also those setting members of less numerical value.

60. In an adding machine, the combination with a series of register wheels, each carrying a series of settable digit determining members, of a group of keys common to all of said register wheels; and means whereby the depression of any key of the group results in the setting in any selected one of said register wheels of a number of said settable digit determining members corresponding to the numerical value of the key depressed.

61. In an adding machine, the combination of a series of register wheels each carrying a series of settable stops; a driver having independent frictional connection with each of said register wheels; a series of keys; and key controlled means for setting in any register wheel a number of said settable stops corresponding to the digit to be added.

62. In an adding machine, the combination of a series of register wheels each carrying a series of settable digit determining members; means for setting said members in accordance with numbers; movable stops cooperating with said members; means for moving said stops to transfer; and an operating handle for rotating said register wheels and restoring said movable stops.

63. In an adding machine, the combination of a series of register wheels each carrying a series of settable digit determining members; means for setting said digit determining members in accordance with numbers; transfer devices coöperating with said digit determining members; and an operating handle and connections for rotating said register wheels and restoring said transfer devices.

64. The combination with a pair of register wheels each carrying a series of settable digit determining members; a movable stop coöperating with the digit determining members of a wheel of higher denomination; means controlled by a wheel of lower denomination for moving said stop to afford an additional unit of movement to the wheel of higher denomination; and an operating mechanism including means for turning said register wheels, and separate means for restoring said stops.

65. In an adding machine, the combination of a series of register wheels each carrying a series of digit determining members; a movable stop coöperating with the digit determining members of each of said register wheels of a denomination above the lowest; means controlled by a wheel of lower denomination for moving the stop of a wheel of higher denomination to afford a transfer; and operating mechanism including means for turning said wheels and a device for restoring said stops.

66. In an adding machine, the combination with a series of register wheels each carrying a series of settable digit determining members, of transfer devices including movable stops coöperating with said settable digit determining members, and cams for moving one of said settable digit determining members out of the path of a stop.

67. In an adding machine, the combination of a pair of register wheels each carrying a series of settable digit determining members; a movable stop arm having two stop portions, one normally extending into the path of those digit determining members of the wheel of higher denomination which are in operative position; means controlled by the wheel of lower denomination for moving said arm to bring the first stop portion thereof out of the path of said member and the second stop portion into the path of said member; and means for restoring said arm.

68. In an adding machine, the combination with a pair of register wheels each carrying a series of settable digit determining members, of a movable arm having a stop portion normally in position to arrest any of the settable digit determining members of the wheel of higher denomination which is in operative position; means controlled by the wheel of lower denomination for swinging said arm to bring said stop portion out of the path of said member; a second stop portion on said arm for arresting said member when the arm is so moved; a cam on said arm for camming said member to inoperative position when said arm is restored to normal position; and means for restoring said arm to normal position.

69. In an adding machine, the combination of a series of register wheels each carrying a series of settable stop pieces; a series of arms, one for each register wheel, each of said arms comprising a stop portion for arresting said stop pieces and a cam portion for engaging said stop pieces to move said stop pieces to inoperative position.

70. In an adding machine, the combination of a series of register wheels each carrying a series of settable stop pieces; a series of transfer levers for said register wheels; means controlled by a wheel of lower denomination for operating the transfer lever which controls a wheel of higher denomination; and operating mechanism comprising means for operating said register wheels and a restoring frame for restoring said transfer levers.

71. In an adding machine, the combination of a series of register wheels each carrying a series of settable stops; a series of keys; a key controlled means for setting said stops in accordance with numbers to be added; and zero setting mechanism comprising a series of cams or wipers movable into and out of position to set said stops.

72. In an adding machine, the combination of a series of register wheels each carrying a series of settable stops; a series of keys; key controlled means for setting said stops in accordance with numbers to be added; zero setting mechanism comprising a series of cams or wipers movable into and out of position to set said stops; and a series of arresting devices for arresting said wheels at zero position.

73. In an adding machine, the combination of a series of register wheels each independently frictionally driven to add numbers; a series of keys; key controlled means for controlling the operation of said adding wheels; and a zero setting device including a frame carrying a series of arresting members movable into position to arrest said register wheels at zero.

74. In an adding machine, the combination of a series of register wheels each carrying a series of settable stops; means for setting in any register wheel a number of said stops corresponding to a digit to be added; means for operating said register wheels; and zero setting mechanism comprising a series of cams adapted to set such a number of said stops as may be necessary to bring the register wheels into zero position.

75. In an adding machine, the combination of a series of register wheels each carrying a series of settable stops; means for setting in any register wheel a number of said stops corresponding to the digit to be added; and zero setting mechanism comprising means for automatically setting in each wheel such a number of said stops as may be necessary to bring that wheel into zero position.

76. In an adding machine, the combination of a series of register wheels each carrying a series of settable stops; a series of keys; key controlled means for setting in any register wheel a number of said stops corresponding to a digit to be added; a series of transfer levers coöperating with said stops; zero setting mechanism comprising means for moving all of said transfer levers to operated position; and means for setting in each wheel such a number of said stops as is necessary to bring that wheel to zero position.

77. In an adding machine, the combination of a series of register wheels each carrying a series of settable stops; a series of keys; key controlled means for setting said stops in accordance with numbers to be added; a series of transfer levers coöperating with said stops; and zero setting mechanism comprising means for operating all of said transfer levers; and a series of cams movable into the paths of said stops.

78. In an adding machine, the combination of a series of register wheels each carrying a series of settable stops; a series of keys for controlling said stops; zero setting mechanism comprising a frame; a series of cams mounted on said frame; means for moving said frame to bring said cams into the paths of said stops; a friction spring for holding said frame in its operated position; and an operating mechanism comprising means for turning said register wheels and for restoring said frame.

79. In a combined typewriting and adding machine, the combination with the keys, the key controlled printing means and the carriage, of a series of register wheels; a denomination selecting device for said register wheels; a rotary shaft for controlling said denomination selecting device; and an operating mechanism for said register wheels including a hollow shaft concentric with said rotary shaft.

80. In an adding machine, the combination of a series of register wheels; a shaft on which said register wheels are mounted; a second shaft disposed end to end of the first mentioned shaft; and denomination selecting devices controlled by said second shaft.

81. In an adding machine, the combination of a series of register wheels; a shaft on which said register wheels are mounted; a gear wheel co-axial with said shaft; a series of rotary shafts having pinions which mesh with said gear wheel; and means whereby numbers are set up on said register wheels by said series of shafts.

82. In an adding machine, the combination of a series of register wheels; a series of shafts one for each digit, said shafts being mounted for rotary and reciprocatory motion; means for rotating said shafts to select the denomination; a series of reciprocatory bars one for each shaft; a series of rock shafts one for each bar; and a series of keys one for each rock shaft, whereby the depression of a key results in rocking one of said rock shafts and reciprocating one of said bars and one of said rotary and reciprocatory shafts.

83. In an adding machine, the combination of a key; a lever operated by said key; a rock shaft operated by said lever; means for connecting said rock shaft with said lever during a part only of the stroke of the lever; and setting devices operated by said rock shaft.

84. In a writing and adding machine, the combination of a series of keys; a series of register wheels; setting devices for said register wheels; rock shafts actuated by said keys and actuating said setting devices; and means for connecting one of said keys with its rock shaft during a part only of the depression of said key.

85. In a writing and adding machine, the combination of a series of keys; printing means controlled by said keys a series of register wheels; setting devices for said register wheels; rock shafts for actuating said setting devices; a series of levers connected with said keys; a second series of levers connected with said rock shafts; and snap-off connections between the respective levers of the two series.

86. In an adding machine, the combination of a series of registering elements; a group of keys common to said registering elements; a denomination selecting device including a member having a step by step motion to connect said keys with one after another of said registering elements; and a lock for said keys including a member which is adjustable to be engaged by said movable member at different points in the travel thereof.

87. In an adding machine, the combination of a series of registering elements; a group of keys common to said registering elements; a series of slides one connected with each key; a denomination selecting device for bringing said registering elements under the control of said keys one after another; a locking member having openings into which said slides are free to move; and means whereby said denomination selecting device may move said locking member to lock said slides.

88. In an adding machine, the combination of a shaft, a series of register wheels mounted on said shaft and frictionally connected therewith; settable stops carried by said register wheels; means for setting in any register wheel a number of said stops corresponding to a digit to be added; and a series of cams or wipers for restoring said stops to normal position.

89. In a combined typewriting and adding machine, the combination with typewriting mechanism including a carriage, types, figure keys, and letter keys for writing any words and numbers, means for setting up the digits of a number written by said typewriting mechanism, register wheels, means for operating said register wheels in accordance with the number set up, and means automatically brought into action at the end of the setting-up operation for preventing inadvertent operation of said numeral keys until the operating mechanism shall have been operated.

90. In a combined typewriting and adding machine, the combination of a typewriter carriage, means for writing any words and numbers, said means including numeral keys, means controlled by said numeral keys and said carriage for setting up the digits of a number to be added, means controlled by the motion of said carriage for locking the numeral keys at the end of the setting-up operation, and means for thereafter disconnecting said locking means from said carriage automatically by the movement of said carriage, whereby said carriage is free to proceed with its travel leaving said numeral keys locked.

91. In a combined typewriting and adding machine, the combination of a typewriter carriage, means for writing any words and numbers, said means including numeral keys, means for setting up numbers written by said numeral keys, means for locking said numeral keys automatically at the end of the setting-up operation, register wheels, operating mechanism for operating said register wheels in accordance with the number set up, means whereby said operating means releases said numeral keys from said lock, and hand operated means for operating said lock.

92. In a combined typewriting and adding machine, the combination of typewriting mechanism including a carriage, keys and printing instrumentalities controlled by said keys, adding mechanism, means whereby said adding mechanism locks keys of said typewriting mechanism when said typewriter carriage reaches a predetermined letter space position, and means for unlocking said locking means, the construction and arrangement being such that said locking means cannot be unlocked by a movement of said typewriter carriage.

93. In a combined typewriting and adding machine, the combination of typewriting mechanism including a carriage, keys and printing instrumentalities controlled by said keys, adding mechanism controlled by said typewriting mechanism, and means whereby said adding mechanism locks certain of said keys when said carriage reaches a predetermined letter space position.

94. In an adding machine, the combination of a series of register wheels and means for setting up numbers to be added on said register wheels, said means including a series of shafts, one for each digit, each shaft having a spirally arranged series of devices, one for each wheel, means for rotating said shafts in unison to select the denomination, and means controlled by said spirally arranged devices for determining the digit to be added in the selected denomination.

95. In a combined typewriting and adding machine, the combination of a typewriter carriage, printing instrumentalities, numeral keys, register wheels, and means for connecting one after another of said register wheels with the keys, said means including a drum, a cord connecting said drum with the typewriter carriage, a device mounted for rotation concentrically with said drum, and means connecting said device with said drum including a toothed disk connected with one of the parts and a detent or latch connected with the other part and engaging said toothed disk, whereby the two parts can be adjusted one with relation to the other to vary the position of the adding column in the line of writing.

96. In a combined typewriting and adding machine, the combination of a typewriter carriage, printing instrumentalities, denominational members, numeral keys, and means for bringing one after another of said denominational members under control of said numeral keys, said means including a drum that rotates in unison with the travel of the carriage, a rotary denomination selecting device that rotates in unison with said drum, and means for effecting a rotary adjustment between said drum and said rotary device.

97. In a combined typewriting and adding machine, the combination of a typewriter carriage, types and printing keys for writing any words and numbers, adding mechanism for adding numbers written by said typewriting mechanism, said adding mechanism including a denomination selecting device capable of moving step by step in accordance with the step-by-step movements of the typewriter carriage, and connections between said carriage and said denomination selecting device including a coupler arranged to couple said denomination selecting device with said carriage at a predetermined point in the line of writing and to become uncoupled when the carriage has passed the adding position leaving said carriage free to move on beyond said adding position in either direction.

98. In a combined typewriting and adding machine, the combination of a typewriter carriage, types and keys for writing any words and numbers, a step-by-step moving denomination selecting device for the adding mechanism, a part that moves in unison with the motion of the typewriter carriage, and means for coupling said denomination selecting device and said part together when the carriage reaches the adding column and for uncoupling them when the carriage gets out of the adding column, whereby said denomination selecting device moves in unison with the carriage during the travel of the carriage in either direction through the adding column, and remains stationary during the travel of the carriage at either the right-hand side or the left-hand side of the adding column.

99. In a combined typewriting and adding machine, the combination of a typewriter carriage, types and keys for writing any words and numbers, a denomination selecting device for the adding mechanism, a part that moves in unison with the typewriter carriage, a dog, and means for causing said dog to couple together said denomination selecting device and said part during the travel of the typewriter carriage through the adding column and to uncouple them at all other parts of the travel of said carriage.

Signed at the borough of Manhattan, city of New York, in the county of New York, and State of New York, this 30th day of August, A. D. 1904.

ARTHUR W. CLAUDER.

Witnesses:
JOHN N. OLIVER,
CHARLES E. SMITH.